US012371526B2

(12) United States Patent
Harris et al.

(10) Patent No.: US 12,371,526 B2
(45) Date of Patent: Jul. 29, 2025

(54) METAL POLYOLS FOR USE IN A POLYURETHANE POLYMER

(71) Applicant: Dow Global Technologies LLC, Midland, MI (US)

(72) Inventors: William J. Harris, Lake Jackson, TX (US); Dakai Ren, Manvel, TX (US); Stephen W. King, Galveson, TX (US); Xue Chen, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 705 days.

(21) Appl. No.: 17/626,224

(22) PCT Filed: Jul. 7, 2020

(86) PCT No.: PCT/US2020/040979
§ 371 (c)(1),
(2) Date: Jan. 11, 2022

(87) PCT Pub. No.: WO2021/011226
PCT Pub. Date: Jan. 21, 2021

(65) Prior Publication Data
US 2022/0282024 A1 Sep. 8, 2022

Related U.S. Application Data

(60) Provisional application No. 62/873,442, filed on Jul. 12, 2019.

(51) Int. Cl.
| | |
|---|---|
| C08G 18/46 | (2006.01) |
| C08G 18/08 | (2006.01) |
| C08G 18/18 | (2006.01) |
| C08G 18/22 | (2006.01) |
| C08G 18/30 | (2006.01) |
| C08G 18/42 | (2006.01) |
| C08G 18/48 | (2006.01) |
| C08G 18/50 | (2006.01) |
| C08G 18/76 | (2006.01) |
| C08G 63/68 | (2006.01) |
| C08G 63/685 | (2006.01) |
| C08G 63/91 | (2006.01) |
| C08G 65/332 | (2006.01) |
| C08G 65/333 | (2006.01) |

(52) U.S. Cl.
CPC ..... *C08G 18/4615* (2013.01); *C08G 18/0823* (2013.01); *C08G 18/18* (2013.01); *C08G 18/222* (2013.01); *C08G 18/302* (2013.01); *C08G 18/4219* (2013.01); *C08G 18/4263* (2013.01); *C08G 18/482* (2013.01); *C08G 18/5021* (2013.01); *C08G 18/7664* (2013.01); *C08G 63/6856* (2013.01); *C08G 63/916* (2013.01); *C08G 65/3328* (2013.01); *C08G 65/33317* (2013.01); *C08G 2110/0025* (2021.01); *C08G 2110/005* (2021.01)

(58) Field of Classification Search
CPC .................. C08G 63/6856; C08G 63/916
See application file for complete search history.

(56) References Cited

U.S. PATENT DOCUMENTS

| | | | |
|---|---|---|---|
| 3,697,456 A | 10/1972 | Pitts et al. | |
| 3,951,822 A | 4/1976 | Brown et al. | |
| 4,053,439 A | 10/1977 | Chlystek | |
| 4,185,043 A | 1/1980 | Shaffer | |
| 4,220,729 A | 9/1980 | Ohkubo et al. | |
| 4,263,411 A | 4/1981 | Bak | |
| 4,356,274 A | 10/1982 | Sandler et al. | |
| 4,482,701 A * | 11/1984 | Yamamori | C08K 5/57 528/304 |
| 5,482,704 A | 1/1996 | Sweger et al. | |
| 6,103,822 A | 8/2000 | Housel et al. | |
| 6,342,578 B1 * | 1/2002 | Huang | C08G 63/183 528/271 |
| 2006/0069175 A1 | 3/2006 | Barber et al. | |
| 2015/0051304 A1 | 2/2015 | Shieh | |

(Continued)

FOREIGN PATENT DOCUMENTS

| | | |
|---|---|---|
| CA | 1139050 | 1/1983 |
| CN | 103554428 | 2/2014 |
| CN | 109248667 A | 1/2019 |

(Continued)

OTHER PUBLICATIONS

JP-05271600-1993-10-19_English Translation.*
International Search Report & Written Opinion for related PCT Application PCT/US2020/040979, mailed Oct. 6, 2020 (16 pgs).
Borax: "Zinc Borate, Firebrake ZB, CAS No. 138265-88-00"; Jan. 1, 2020 (2 pgs).
Guo, et al., "Structural Characterization, Thermal and Mechanical Properties of Polyurethane/CoAl Layered Double Hydroxide Nanocomposites Prepared via in situ Polymerization"; Composites Science and Technology, vol. 71, No. 6, Dec. 1, 2020 (6 pgs).

(Continued)

*Primary Examiner* — Michael L Leonard

(57) ABSTRACT

The present disclosure provides for a metal chelated polyol liquid and/or a metal chelated polyether polyol liquid that can be used in an isocyanate-reactive composition and a reaction mixture for forming a polyurethane polymer. The metal chelated polyester polyol liquid is a reaction product of a chelating polyester polyol having a chelating moiety and a metal compound having a metal ion. The metal chelated polyether polyol liquid is a reaction product of a chelating polyether polyol having a chelating moiety and a metal compound having a metal ion. The chelating moiety of the chelating polyester polyol or the chelating polyether polyol chelates the metal ion to form the metal chelated polyester polyol liquid or the metal chelated polyether polyol liquid, respectively, having a mole ratio of the metal ion to the chelating moiety of 0.05:1 to 2:1.

12 Claims, No Drawings

(56) References Cited

U.S. PATENT DOCUMENTS

2019/0194413 A1 6/2019 Okada et al.

FOREIGN PATENT DOCUMENTS

JP 05271600 A * 10/1993
JP 11140150 7/2011

OTHER PUBLICATIONS

Liu, et al., "Synthesis, Anion Exchange, and Delamination of Co—Al Layered Double Hydroxide: Assembly of the Exfoliated Nanosheet/Polyanion Composite Films and Magneto-Optical Studies"; Journal of the American Chemical Society, vol. 128, No. 14, Apr. 1, 2006 (9 pgs).

International Preliminary Report on Patentability for related PCT Application PCT/US2020/040979, mailed Jan. 27, 2022 (11 pgs).

Tulu, et al., Synthesis and properties of hydrophilic polymers. Part 7. Preparation, characterization and metal complexation of carboxy-functional polyesters based on poly(ethylene glycol); Society of Chemical Industry, Polymer International, vol. 48, May 20, 1999 (6 pgs).

Bao, et al., Synthesis, characterization, and self-assembly behaviors of a biodegradable and anti-clotting poly(EDTA-diol-co-butylene adipate glycol urethanes); Journal of Materials Chemistry B, Royal Society of Chemistry, Jul. 2, 2014 (10 pgs).

Arsalani, et al., "Synthesis and Characterization of Watersoluble and Carboxy-functional Polyester and Polyamide Based on Ethylenediaminetetraacetic Acid and Their Metal Complexes"; Iranian Polymer Journal, vol. 12, No. 4, Mar. 1, 2003 (6 pgs).

Di Noto, et al., "Synthesis and Characterization of Lithium and Magnesium Complexes Based on [EDTA][PEG400]2 and [EDTA]3[PEG400]7"; Macromolecular Chemistry and Physics, vol. 203, No. 9, Feb. 6, 2002 (17 pgs).

Indira, et al., "Synthesis and Characterization of water soluble EDTA functionalized polyesters for environmental applications"; Elixir International Journal, Sep. 3, 2014 (5 pgs).

* cited by examiner

METAL POLYOLS FOR USE IN A POLYURETHANE POLYMER

This application is a National Stage Application under 35 U.S.C. § 371 of International Application Number PCT/US2020/040979, filed Jul. 7, 2020 and published as WO 2021/011226 on Jan. 21, 2021, which claims the benefit to U.S. Provisional Application 62/873,442, filed Jul. 12, 2019, the entire contents of which are incorporated herein by reference in its entirety.

FIELD OF DISCLOSURE

The present disclosure relates generally to a polyurethane polymer and more particularly to a polyurethane polymer with improved combustion/smoke behavior.

BACKGROUND

Polyurethane rigid (PUR) foam has been used in construction since the 1960s as a high-performance insulation material. Continued technical developments in Europe and the US have led to the next product generation called polyisocyanurate rigid (PIR) foam. Both PUR and PIR are polyurethane-based foams manufactured from the two reactants, isocyanate (e.g., methyl diphenyl diisocyanate, MDI) and polyol. While for PUR, the isocyanate and polyol are implemented near a balanced ratio compared to the equivalent weights, the isocyanate is used in excess during the production of PIR. The isocyanate reacts in part with itself, where the resulting PIR is a heavily cross-linked synthetic material with ring-like isocyanurate structures. The high degree of linkage and the ring structures ensure the high thermal stability of the rigid PIR foam. PIR also has superior thermal stability and dimensional stability.

PIR foams are also characterized by a very good fire resistance behavior thanks to the inherent charring behavior, in turn related to the outstanding thermal stability of the isocyanurate chemical structure. To further enhance char formation, it is common to add a phosphorous-based flame retardant. When a building product, such as an insulating metal panel or an insulation board, is exposed to fire, the insulating PIR core rapidly forms a coherent char that helps protecting underlying material. That translates to only a limited portion of the available combustible insulating material exposed to the fire that actually contributes in terms of heat release and smoke.

Fire behavior of combustible thermoset material is a complex matter. As an example, halogenated flame retardants are very effective in reducing heat release but may increase smoke opacity. Dow patent publication US 2014/0206786 A1 describes the use of triethyl phosphate (TEP) as a smoke suppressant additive when compared with a conventional halogenated flame retardant such as tris-(2-chloroisopropyl) phosphate (TCPP). Moreover, as is well known, the composition of combustion effluents (further than on the material itself) strongly depends on fire conditions, particularly temperature, geometry and ventilation including availability of oxygen. Even if, as noted above, the intrinsic charring behavior of polyisocyanurate limits and/or delays the amount of polymer burned (therefore limiting and/or delaying the release of heat and smoke), still it is desirable to further modify the combustion/burning behavior and therefore reduce as much as possible smoke opacity and smoke toxicants.

Polyurethanes also are used widely in a large array of coating, adhesive, sealant and elastomer ("CASE") applications and flexible foams. It is desirable to further modify the combustion/burning behavior and therefore reduce as much as possible smoke opacity and smoke toxicants as well as optionally modify other attributes such as antifungal, antimicrobial, odor resistance, hardness, sound dampening, and friction resistance of polyurethanes utilized as coatings, adhesives, sealants, and elastomers, and foams.

SUMMARY

The present disclosure provides for a metal chelated polyester polyol liquid and/or a metal chelated polyether polyol liquid where either or both can be used in an isocyanate-reactive composition, which is used in a reaction mixture for forming a polyurethane polymer. The polyurethane polymer of the present disclosure can have improved smoke behavior with respect to emission of hydrogen cyanide (HCN) and carbon monoxide (CO) during a pyrolysis event (e.g., a fire).

For the various embodiments, the metal chelated polyester polyol liquid is a reaction product of a chelating polyester polyol, having a chelating moiety, and a metal compound having a metal ion. The chelating polyester polyol is formed from a chemical reaction of monomers for a liquid polyester polyol or the liquid polyester polyol formed from the monomers for the liquid polyester polyol and a chelating agent having the chelating moiety. In other embodiments, the metal chelated polyether polyol liquid is a reaction product of a chelating polyether polyol, having a chelating moiety, and a metal compound having a metal ion. The chelating polyether polyol is formed from a chemical reaction of monomers for a liquid polyether polyol or the liquid polyether polyol formed from the monomers for the liquid polyether polyol and a chelating agent having the chelating moiety.

The chelating moiety is selected from a dianhydride moiety, an amino based chelating moiety and combinations thereof. For the embodiments, the chelating agent having the dianhydride moiety chemically reacts with the monomers for the liquid polyester polyol or the liquid polyester polyol formed from the monomers for the liquid polyester polyol to form the chelating polyester polyol having an aminopolycarboxylic acid moiety. Alternatively, the chelating agent having the amino based chelating moiety chemically reacts with the monomers for the liquid polyester polyol or the liquid polyester polyol formed from the monomers for the liquid polyester polyol to form a polyesteraminopolyol as the chelating polyester polyol. The chelating moiety of the chelating polyester polyol chelates the metal ion to form the metal chelated polyester polyol liquid having a mole ratio of the metal ion to the chelating moiety of 0.05:1 to 2:1.

For the embodiments, the chelating agent having the dianhydride moiety can chemically react with the liquid polyester polyol at a mole ratio of 1:1.5 to 1:100 (moles chelating agent: moles polyester polyol) to form the chelating polyester polyol having an aminopolycarboxylic acid moiety. For the embodiments, the chelating agent having the dianhydride moiety is selected from the group consisting of ethylenediaminetetraacetic dianhydride, diethylenetriaminepentaacetic acid dianhydride and combinations thereof. For the embodiments, the chelating agent having the amino based chelating moiety is selected from the group consisting of an alkoxylated diamine, an alkoxylated triamine, an alkoxylated tetraamine and combinations thereof. For the embodiments, the metal compound is selected from the group consisting of a hydroxide, a carbonate, a carboxylate, a basic carbonate, a metal salt and combinations thereof and the metal ion is selected from the group consisting of copper, zinc, silver, iron, manganese, cobalt, nickel, zirconium, calcium, aluminum, barium, cadmium, gallium, indium, lead, magnesium, mercury, palladium, scandium, strontium, thorium, titanium, vanadium and combinations thereof. Preferably, the metal compound is a transition metal compound where the transition metal ion is selected from the group consisting of copper, zinc, silver, iron, manganese, cobalt, nickel, titanium, vanadium, cadmium, and zirconium. Preferably, the transition metal compound is selected from the group consisting of copper (II) hydroxide, copper (II) carbonate, basic copper (II) carbonate, copper (II) acetate, cobalt (II) acetate, nickel (II) acetate, silver (I) acetate, zinc (II) acetate, and combinations thereof.

In additional embodiments, the chelating agent having the dianhydride moiety chemically reacts with the monomers for the liquid polyether polyol or the liquid polyether polyol formed from the monomers for the liquid polyether polyol to form the chelating polyether polyol having an aminopolycarboxylic acid moiety. Alternatively, the chelating agent having the amino based chelating moiety chemically reacts with the monomers for the liquid polyether polyol or the liquid polyether polyol formed from the monomers for the liquid polyether polyol to form a polyetheraminopolyol as the chelating polyether polyol. The chelating moiety of the chelating polyether polyol chelates the metal ion to form the metal chelated polyether polyol liquid having a mole ratio of the metal ion to the chelating moiety of 0.05:1 to 2:1. For the embodiments, the chelating agent having the dianhydride moiety can chemically reacts with the liquid polyether polyol at a mole ratio of 1:1.5 to 1:100 (moles chelating agent: moles polyether polyol) to form the chelating polyether polyol having an aminopolycarboxylic acid moiety. For the embodiments, the chelating agent having the dianhydride moiety is selected from the group consisting of ethylenediaminetetraacetic dianhydride, diethylenetriaminepentacetic acid dianhydride and combinations thereof. For the embodiments, the chelating agent having the amino based chelating moiety in the polyetherpolyols is selected from the group consisting of a diamine, a triamine, a tetramine and a combinations thereof. For the embodiments, the metal compound is selected from the group consisting of a hydroxide, a carbonate, a carboxylate, a basic carbonate, a metal salt and combinations thereof and the metal ion is selected from the group consisting of copper, zinc, silver, iron, manganese, cobalt, nickel, zirconium, calcium, aluminum, barium, cadmium, gallium, indium, lead, magnesium, mercury, palladium, scandium, strontium, thorium, titanium, vanadium and combinations thereof. Preferably, metal compound is a transition metal compound where the transition metal ion is selected from the group consisting of copper, zinc, silver, iron, manganese, cobalt, nickel, titanium, vanadium, cadmium, and zirconium. Preferably the transition metal compound is selected from the group consisting of copper (II) hydroxide, copper (II) carbonate, basic copper (II) carbonate, copper (II) acetate, cobalt (II) acetate, nickel (II) acetate, silver (I) acetate, zinc (II) acetate and combinations thereof.

The present disclosure also provides for an isocyanate-reactive composition having a hydroxyl moiety for forming a polyurethane polymer. For the embodiments, the isocyanate-reactive composition includes 0.1 to 100 weight percent of the metal chelated polyester polyol liquid, the metal chelated polyether polyol liquid or a combination of both the metal chelated polyester polyol liquid and the metal chelated polyether polyol liquid, each as provided herein, and optionally up 99.9 weight percent of a polyol to form the isocyanate-reactive composition, the weight percent based on the total weight of the isocyanate-reactive composition. For the embodiments, the isocyanate-reactive composition further includes a compound selected from 0.1 wt. % to 1.5 wt. % of phosphorus from a flame-retardant compound, preferably a halogen-free flame-retardant compound, the wt. % of phosphorus based on the overall weight of the isocyanate-reactive composition, 0.05 wt. % to 3.0 wt. % of the metal from the metal chelated polyester polyol liquid and/or the metal chelated polyether polyol liquid, and combinations thereof, where the wt. % of the metal is based on the overall weight of the isocyanate-reactive composition. For the embodiments, the isocyanate-reactive composition has a molar ratio of the metal to phosphorus (mole metal:mole phosphorous) of 0.05:1 to 5:1. For the embodiments, the flame-retardant compound or halogen-free flame-retardant compound is selected from the group consisting of a phosphate, a phosphonate, a phosphinate, phosphite, and combinations thereof.

The present disclosure also provides for a reaction mixture for forming a polyurethane polymer. The reaction mixture includes an isocyanate compound having an isocyanate moiety and the isocyanate-reactive composition as provided herein, where the reaction mixture has a molar ratio of the isocyanate moiety to the hydroxyl moiety of 0.90:1 to 7:1. For the embodiments, the reaction mixture can include compounds selected from the group consisting of water, a catalyst, a surfactant, a blowing agent or combinations thereof. For the embodiments, the reaction mixture provided herein can be used to form a polyurethane-based polymer, including a polyurethane-based foam.

The present disclosure also provides for a process for preparing the metal chelated polyester polyol liquid. The process includes reacting monomers for a liquid polyester polyol or the liquid polyester polyol formed from the monomers for the liquid polyester polyol and a chelating agent having a chelating moiety to form a chelating polyester polyol. For the embodiments, the chelating moiety is selected from a dianhydride moiety, an amino based chelating moiety and combinations thereof. For the embodiments, the chelating agent having the dianhydride moiety chemically reacts with the monomers for the liquid polyester polyol or the liquid polyester polyol formed from the monomers for the liquid polyester polyol to form the chelating polyester polyol having an aminopolycarboxylic acid moiety. For the embodiments, the chelating agent having the amino based chelating moiety chemically reacts with the monomers for the liquid polyester polyol or the liquid polyester polyol formed from the monomers for the liquid polyester polyol to form a polyesteraminopolyol as the chelating polyester polyol. For the embodiments, the process also includes reacting the chelating polyester polyol having the chelating moiety with a metal compound having a metal ion, where the chelating moiety of the chelating polyester polyol chelates the metal ion to form the metal chelated polyester polyol liquid, the reaction having a mole ratio of the metal ion to the chelating moiety of 0.05:1 to 2:1. For the embodiments, the chelating agent having the dianhydride moiety chemically reacts with the liquid polyester polyol formed from the monomers for the liquid polyester polyol at a mole ratio of 1:1.5 to 1:100 (moles chelating agent: moles polyester polyol) to form the chelating polyester polyol having the aminopolycarboxylic acid moiety.

The present disclosure also provides for a process for preparing the metal chelated polyether polyol liquid. The process includes reacting monomers for a liquid polyether polyol or the liquid polyether polyol formed from the monomers for the liquid polyether polyol and a chelating agent having a chelating moiety to form a chelating polyether polyol. For the embodiments, the chelating moiety is selected from a dianhydride moiety, an amino based chelating moiety and combinations thereof. For the embodiments, the chelating agent having the dianhydride moiety chemically reacts with the monomers for the liquid polyether polyol or the liquid polyether polyol formed from the monomers for the liquid polyether polyol to form the chelating polyether polyol having an aminopolycarboxylic acid moiety. For the embodiments, the chelating agent having the amino based chelating moiety chemically reacts with the monomers for the liquid polyether polyol or the liquid polyether polyol formed from the monomers for the liquid polyether polyol to form a polyetheraminopolyol as the chelating polyether polyol. For the embodiments, the process also includes reacting the chelating polyether polyol having the chelating moiety with a metal compound having a metal ion, where the chelating moiety of the chelating polyether polyol chelates the metal ion to form the metal chelated polyether polyol liquid, the reaction having a mole ratio of the metal ion to the chelating moiety of 0.05:1 to 2:1. For the embodiments, the chelating agent having the dianhydride moiety chemically reacts with the liquid polyether polyol formed from the monomers for the liquid polyether polyol at a mole ratio of 1:1.5 to 1:100 (moles chelating agent: moles polyester polyol) to form the chelating polyether polyol having the aminopolycarboxylic acid moiety.

DETAILED DESCRIPTION

The present disclosure provides for a metal chelated polyester polyol liquid and/or a metal chelated polyether polyol liquid where either or both can be used in an isocyanate-reactive composition and a reaction mixture for forming a polyurethane polymer. The polyurethane polymer of the present disclosure can have improved smoke behavior with respect to emission of hydrogen cyanide (HCN) and carbon monoxide (CO) during a pyrolysis event (e.g., a fire).

For the embodiments, the metal chelated polyester polyol liquid is a reaction product of a chelating polyester polyol having a chelating moiety and a metal compound having a metal ion. The chelating polyester polyol is formed from a chemical reaction of the monomers used in forming the liquid polyester polyol or the liquid polyester polyol formed from the monomers and a chelating agent having the chelating moiety. In other embodiments, the metal chelated polyether polyol liquid is a reaction product of a chelating polyether polyol having a chelating moiety and a metal compound having a metal ion. The chelating polyether polyol is formed from a chemical reaction of the monomers used in forming the liquid polyether polyol or the liquid polyether polyol formed from the monomers and a chelating agent having the chelating moiety.

The chelating moiety of the present disclosure is selected from a dianhydride moiety, an amino based chelating moiety and combinations thereof. For the embodiments, the chelating agent having the dianhydride moiety chemically reacts with the monomers used in forming the liquid polyester polyol or the liquid polyester polyol formed from the monomers to form the chelating polyester polyol having an aminopolycarboxylic acid moiety. Alternatively, the chelating agent having the amino based chelating moiety chemically reacts with the monomers used in forming the liquid polyester polyol or the liquid polyester polyol formed from the monomers to form a polyesteraminopolyol as the chelating polyester polyol. The chelating moiety of the chelating polyester polyol chelates the metal ion from the metal compound to form the metal chelated polyester polyol liquid. Preferably, the metal chelated polyester polyol liquid has a mole ratio of the metal ion to the chelating moiety of 0.05:1 to 2:1. For the embodiments, the chelating agent having the dianhydride moiety can also chemically react with the liquid polyether polyol to form the chelating polyether polyol having an aminopolycarboxylic acid moiety. Alternatively, the chelating agent having the amino based chelating moiety chemically reacts with the monomers used in forming the liquid polyether polyol to form a polyetheraminopolyol as the chelating polyether polyol. The chelating moiety of the chelating polyether polyol chelates the metal ion from the metal compound to form the metal chelated polyether polyol liquid. Preferably, the metal chelated polyether polyol liquid has a mole ratio of the metal ion to the chelating moiety of 0.05:1 to 2:1.

As used herein, the metal chelated polyester polyol liquid and/or the metal chelated polyether polyol liquid is in a liquid state at a pressure of 80 to 25,000 KPa and is in a liquid state at a temperature above −10° C. and lower than 80° C., preferably lower than 60° C., more preferably lower than 40° C., most preferably lower than 25° C. As used herein, the metal chelated polyester polyol liquid and/or the metal chelated polyether polyol liquid contain no-to-nominal amounts of metal compound particles/solids such that a nominal amount of metal compound particles/solids is less than 0.10 weight percent (wt. %), preferably less than 0.01 wt. %, more preferably less than 0.001 wt. % based on the weight of the metal chelated polyester polyol liquid and/or the metal chelated polyether polyol liquid.

The chelating polyester polyol of the present disclosure is formed from a chemical reaction with either the monomers used in forming the liquid polyester polyol or the liquid polyester polyol formed from the monomers and the chelating agent having the chelating moiety. The liquid polyester polyol may be a homopolymer, a random copolymer, a block copolymer, a segmented copolymer as well as a capped product that may contain residues of the initiator in the case of a ring-opened polyester polyol. The liquid polyester polyol can have a low to moderate number average molecular weight ranging from 100 to 5,000, preferably 200 to 2,500, more preferably from 300 to 1,000 and most preferably from 350 to 750. The number average molecular weight can be measured using end group analysis or gel permeation chromatography (GPC), as is known in the art. The liquid polyester polyol can also have a number averaged isocyanate reactive group functionality (e.g., hydroxyl groups) per molecule of 1.8 to 4, such as 2 to 3, where each value is an average number. A variety of chemical structures may make up the liquid polyester polyol with at least one requirement being the presence of at least two hydroxyl groups (i.e., a diol) and that the liquid polyester polyol be in a liquid state at a pressure of 80 to 25,000 KPa and is in liquid state at a temperature lower than 80° C. to provide the liquid polyester polyol of the present disclosure.

For the embodiments, monomers used in forming the liquid polyester polyol can include a polyhydric alcohol, such as dihydric alcohols, trihydric alcohols, and/or higher hydric alcohols, and a polybasic acid, such as a dibasic acid and/or tribasic acid such as a carboxylic acid and/or polycarboxylic acid anhydrides or corresponding polycarboxylic acid esters of lower alcohols, a cyclic ester or mixtures thereof, where these compounds are reacted as is known in the art to form a reaction product of the liquid polyester polyol. Exemplary polyhydric alcohols include, but are not limited to, ethylene glycol, propylene glycol-(1,2) and -(1,3), butylene glycol-(1,4) and -(2,3), hexanediol-(1,6), octanediol-(1,8), neopentyl glycol, cyclohexanedimethanol (1,4-bis-hydroxy-methylcyclohexane and other isomers), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyhydric alcohols can also include polycarbonate polyols, such as the reaction product of diols, such as propanediol-(1,3), butanediol-(1,4) and/or hexanediol-(1,6), diethylene glycol, triethylene glycol or tetraethylene glycol, with diarylcarbonates, such as diphenylcarbonate, dialiphaticcarbonates, such as dimethylcarbonate or phosgene or from the reaction of oxiranes and carbon dioxide.

The polybasic acids may be aliphatic, cycloaliphatic, aromatic and/or heterocyclic and they may be substituted, e.g. by halogen atoms, and/or may be unsaturated. Suitable polybasic acids, anhydrides, and polycarboxylic acid esters of lower alcohols include, but are not limited to, succinic acid, adipic acid, suberic acid, azelaic acid, sebacic acid, phthalic acid, isophthalic acid, terephthalic acid, trimellitic acid, phthalic acid anhydride, trimellitic anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters.

The cyclic ester may be aliphatic and may be substituted, e.g. by alkyl groups, and/or may be unsaturated. Suitable cyclic esters include but are not limited to c-caprolactone, d,l-lactide, glycolide, δ-valerolactone and pivolactone, among others.

The liquid polyester polyol can be aromatic, aliphatic or cycloaliphatic and can include their hydrogenated products.

Preferred examples of liquid polyester polyols include, but are not limited to, polycaprolactone polyol, polypropiolactone polyol, polyglycolide polyol, polypivolylactone polyol, polyvalerolactone polyol, polyethylene adipate polyol, polypropylene adipate polyol, polybutylene adipate polyol, polyhexamethylene adipate polyol, polyneopentyl adipate polyol, polycyclohexanedimethylene adipate polyol, polyethylene succinate polyol, polypropylene succinate polyol, polybutylene succinate polyol, polyhexamethylene succinate polyol, polyneopentyl succinate polyol, polycyclohexanedimethyl succinate polyol, polyethylene azelate polyol, polypropylene azelate polyol, polybutylene azelate polyol, polyhexamethylene azelate polyol, polyneopentyl azelate polyol, polycyclohexanedimethylene azelate polyol, polyethylene sebacate polyol, polypropylene sebacate polyol, polybutylene sebacate polyol, polyhexamethylene sebacate polyol, polyneopentyl sebacate polyol, polycyclohexanedimethylene sebacate polyol, polyol of diethylene glycol/terephthalic acid, polyol of polyethylene glycol/terephthalic acid, polyol of diethylene glycol/phthalic acid or phthalic anhydride, polyol of polyethylene glycol/phthalic acid or phthalic anhydride, polyol of diethylene glycol/isophthalic acid, polyol of polyethylene glycol/isophthalic acid, and their copolyester polyols.

More preferred examples of liquid polyester polyols include polycaprolactone polyol, polyethylene adipate polyol, polypropylene adipate polyol, polybutylene adipate polyol, polyhexamethylene adipate polyol, polycyclohexanedimethylene adipate polyol, polyethylene succinate polyol, polybutylene succinate polyol, polyol of diethylene glycol/terephthalic acid, polyol of polyethylene glycol/terephthalic acid, polyol of diethylene glycol/phthalic acid or phthalic anhydride, polyol of polyethylene glycol/phthalic acid or phthalic anhydride, polyol of diethylene glycol/isophthalic acid, polyol of polyethylene glycol/isophthalic acid, and the copolyesters of the terephthalates, isophthalates, and/or phthalates of diethylene glycol and/or polyethylene glycol with optional use of glycerol and/or trimethylol propane when average hydroxyl functionality greater than 2.0 is desired. For the various embodiments, the polyester polyol can also be uncapped or capped using ethylene oxide (EO) and/or propylene oxide (PO), as known in the art, so as to provide hydrophilic or hydrophobic structures. Examples of other liquid polyester polyols include modified aromatic polyester polyols such as those provided under the trade designator STEPANPOL PS-2352 (acid number 0.6-1.0 mg KOH/g, hydroxyl number 230-250 mg KOH/g, hydroxyl functionality 2.0, Stepan Company). The liquid polyester polyols may also contain a proportion of carboxyl end groups. Liquid polyester polyols formed with lactones, such as c-caprolactone, or hydroxycarboxylic acids, such as 6-hydroxycaproic acid, may also be used.

The liquid polyether polyol can include those having at least 2, such as 2 or 3 hydroxyl groups per molecule and may be prepared, for example, by polymerization of oxiranes/cyclic ethers, such as ethylene oxide, propylene oxide, butylene oxide, styrene oxide or epichlorohydrin, either on their own, in the presence of $BF_3$, or by a process of chemical addition of these oxiranes, optionally as mixtures (such as mixtures of ethylene oxide and propylene oxide) or successively, to starting components having reactive hydrogen atoms, such as water, ammonia, alcohols, or amines. Examples of suitable starting components include ethylene glycol, propylene glycol-(1,3) or -(1,2), glycerol, trimethylolpropane, 4,4'-dihydroxy-diphenylpropane, aniline, ethanolamine or ethylenediamine. Sucrose-based polyether polyols may also be used. It is in many cases preferred to use polyethers which contain predominant amounts of primary OH groups (up to 100% of the OH groups present in the polyether). The polyether polyol or copolyether polyol should have a nominal functionality of at least 2.0. The nominal functionality preferably is 2.5 to 8, more preferably 2.5 to 7 or 2.5 to 6. The hydroxyl equivalent weight of the polyether polyol or copolyether polyol is at least 85, preferably at least 100, more preferably 150 to 3,200, in some embodiments 250 to 3,000 and in particular embodiments from 300 to 2,500. The polyol can also be formed of a blend, where the blend includes a blend of the diol and triol. The diol can have a number average molecular weight (Mn) of 200 to 8,000 grams/mole and a triol having an average number molecular weight (Mn) of 250 to 6,500 grams/mole. Other examples of suitable polyether polyols include those polymers or copolymers formed with propylene oxide that have a hydroxyl equivalent weight of at least 75. The propylene oxide may be 1,3-propylene oxide, but more typically is 1,2-propylene oxide. If a copolymer, the comonomer is another copolymerizable alkylene oxide such as, for example, ethylene oxide, 2,3-butylene oxide, tetrahydrofuran, 1,2-hexane oxide, and the like. A copolymer may contain 25% or more by weight, 50% or more by weight, and preferably 75% or more by weight polymerized propylene oxide, based on the total weight of polymerized alkylene oxides. A copolymer preferably contains no more than 75%, especially no more than 50% by weight polymerized ethylene oxide.

The chelating agent having the chelating moiety is selected from a dianhydride moiety, an amino based chelating moiety and combinations thereof. The chelating agent having the dianhydride moiety can be an aminopolycarboxylic dianhydride compound. For example, the aminopolycarboxylic dianhydride compound used as the chelating agent having the dianhydride moiety is selected from the group consisting of ethylenediaminetetraacetic dianhydride, diethylenetriaminepentaacetic acid dianhydride and combinations thereof. Other aminopolycarboxylic dianhydride compounds for use as the chelating agent having the dianhydride moiety can include, 4,4'-(propane-1,2-diyl)bis(morpholine-2,6-dione), 4,4'-(propane-1,3-diyl)bis(morpholine-2,6-dione), 4,4'-(oxybis(ethane-2,1-diyl))bis(morpholine-2,6-dione) and combinations thereof. The chelating agent having an amino based chelating moiety can be an aminopolycarboxylic acid containing one or more nitrogen atoms connected through carbon atoms to two or more carboxyl groups as well as tertiary polyamino compounds with at least two tertiary nitrogens connected through carbon atoms and at least one alcohol group and up to five alcohol groups allowing attachment or incorporation as part of the polyesterpolyol. For the various embodiments, the chelating agent having the amino based chelating moiety is selected from the group consisting of a diamine, a triamine, a tetraamine and a combinations thereof. In an additional embodiment, the the chelating agent having the amino based chelating moiety is selected from the group consisting of an alkoxylated diamine, an alkoxylated triamine, an alkoxylated tetraamine, and a combinations thereof. These alkoxylated amines preferably can conform to the Formula I

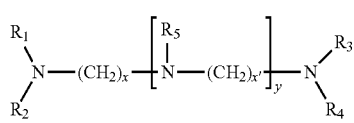

Formula I where $R_1$, $R_2$, $R_3$, $R_4$, and $R_5$ are each independently an alkyl group of C1 to C8, an alkoxylate/polyalkoxylate (i.e., —$(CH_2CHRO)_n$—H, where R is H or an alkyl group of C1 to C3 and n is integer from 1 to 10) and their equivalents with the proviso that at least one of $R_1$, $R_2$, $R_3$, $R_4$, and $R_5$ is an alkoxylate/polyalkoxylate as provided above, x and x' are each independently integers of 2 or 3, and y is an integer of 0, 1, or 2. More preferably for Formula I, $R_1$, $R_2$, $R_3$, $R_4$, and $R_5$ are each independently an alkyl group of C1 to C3, an alkoxylate/polyalkoxylate as provided above where the alkyl group is C1 to C2, with the proviso that at least one of $R_1$, $R_2$, $R_3$, $R_4$, and $R_5$ is an alkoxylate/polyalkoxylate as provided above, x and x' are each an integer of 2, and y is an integer of 0 or 1. Specific examples of the chelating agent having the amino based chelating moiety include N,N,N',N'-tetrakis-(2-hydroxypropyl)ethylenediamine, N,N,N',N'-tetrakis-(2-hydroxyethyl)ethylenediamine, 2-[[2-(dimethylamino)ethyl]methylamino]ethanol, 1-[bis[3-(dimethylamino)propyl]amino-2-propanol], 1,1',1'',1'''-((((2-hydroxypropyl)azanediyl)bis(ethane-2,1-diyl))bis(azanetriyl))tetrakis(propan-2-ol), 2,2',2'',2'''-((((2-hydroxyethyl)azanediyl)bis(ethane-2,1-diyl))bis(azanetriyl))tetrakis(ethan-1-ol), 2,2'-azanediyldiacetic acid; 2,2',2''-nitrilotriacetic acid; ethylenediaminetetraacetic acid; 2-[bis[2-(carboxymethyl)amino]ethyl]amino]acetic acid; ethylene glycol-bis(2-aminoethylether)-N,N,N',N'-tetraacetic acid; 1,2-bis(o-aminophenoxy)ethane-N,N,N',N'-tetraacetic acid; 2,2',2''-(1,4,7-triazonane-1,4,7-triyl)triacetic acid (NOTA); 1,4,7,10-tetraazacyclododecane-1,4,7,10-tetraacetic acid; N-(N-(3-amino-3-carboxypropyl)-3-amino-3-carboxypropyl)azetidine-2-carboxylic acid; and 2-[2-[[2-Hydroxy-1-(2-hydroxyphenyl)-2-oxoethyl]amino]ethylamino]-2-(2-hydroxyphenyl)acetic acid; N,N-dimethyl-N',N'-2 hydroxy(propyl)-1,3-propylene diamine; N,N,N'-trimethyl-N'-hydroxylethyl-bis(amino ethyl) ether; N,N-bis(3-dimethylamino-propyl)-N-isopropanolamine; Bis-(dimethylaminopropyl)amino-2-propanol; N,N,N'-trimethylaminopropyl ethanolamine.

The chelating polyester polyol is formed from a chemical reaction of the monomers used in forming the liquid polyester polyol or the liquid polyester polyol formed from the monomers and the chelating agent having the chelating moiety. For the chemical reaction, the monomers used in forming the liquid polyester polyol or the liquid polyester polyol formed from the monomers can be present in a molar excess relative to the chelating agent. Examples of the molar ratio used in the forming the chelating polyester polyol include a ratio in the range of 3:1 to 200:1 (moles of monomer used in forming the liquid polyester polyol: moles of the chelating agent). Preferably, the range is 5:1 to 100:1 (moles of monomer used in forming the liquid polyester polyol: moles of the chelating agent). For the chemical reaction of the liquid polyester polyol and the chelating agent having the chelating moiety the molar ratio used in the forming the chelating polyester polyol include a ratio in the range of 1.5:1 to 100:1 (moles of liquid polyester polyol: moles of the chelating agent). Preferably, the range is 3:1 to 50:1 (moles of liquid polyester polyol: moles of the chelating agent).

For the embodiments, the chelating agent having the dianhydride moiety chemically reacts with either the monomers used in forming the liquid polyester polyol or the liquid polyester polyol formed from the monomers to form the chelating polyester polyol having an aminopolycarboxylic acid moiety, which acts as the chelating moiety for the chelating polyester polyol. For the various embodiments, the acyl groups of the dianhydride moiety chemically react (e.g., an acetylation reaction) with any of the hydroxyl and/or amine (primary and/or secondary amine) of the monomers used in forming the liquid polyester polyol or the liquid polyester polyol formed from the monomers. Such reactions can take place at atmospheric pressure (e.g., 101.23 KPa) and in a temperature range of 20 to 150° C. with optional basic catalyst (e.g. potassium hydroxide, potassium hydride, sodium hydroxide, sodium hydride). Reaction times can range from 5 minutes up to 24 hours. Aliquots of the chelating agent having the dianhydride moiety can be added to the monomers used in forming the liquid polyester polyol or the liquid polyester polyol formed from the monomers in conducting the reaction.

For the embodiments, the chelating agent having the dianhydride moiety can chemically reacts with the liquid polyester polyol at a mole ratio of 1:1.5 to 1:100 (moles chelating agent: moles polyester polyol) to form the chelating polyester polyol having an aminopolycarboxylic acid moiety, which acts as the chelating moiety for the chelating polyester polyol. Preferably, the chelating agent having the dianhydride moiety can chemically reacts with the liquid polyester polyol at a mole ratio of 1:3 to 1:50 (moles chelating agent: moles polyester polyol) to form the chelating polyester polyol having an aminopolycarboxylic acid moiety. Most preferably, the chelating agent having the dianhydride moiety can chemically react with the liquid polyester polyol at a mole ratio of 1:5 to 1:20 (moles chelating agent: moles polyester polyol) to form the chelating polyester polyol having an aminopolycarboxylic acid moiety.

The chelating polyether polyol is formed from a chemical reaction of the liquid polyether polyol or the monomers used in forming the liquid polyether polyol and the chelating agent having the chelating moiety. For the chemical reaction, the liquid polyether polyol or the monomers used in forming the liquid polyether polyol is present in a molar excess relative to the chelating agent. Examples of the molar ratio used in the forming the chelating polyether polyol include a ratio in the range of 2:1 to 200:1 (moles of monomer used in forming the liquid polyether polyol: moles of the chelating agent). Preferably, the range is 4:1 to 100:1 (moles of monomer used in forming the liquid polyether polyol: moles of the chelating agent). For the chemical reaction of the liquid polyether polyol and the chelating agent having the chelating moiety the molar ratio used in forming the chelating polyether polyol include a ratio in the range of 2:1 to 100:1 (moles of liquid polyether polyol: moles of the chelating agent). Preferably, the range is 3:1 to 50:1 (moles of liquid polyether polyol: moles of the chelating agent).

For the embodiments, the chelating agent having the dianhydride moiety chemically reacts with the liquid polyether polyol to form the chelating polyether polyol having an aminopolycarboxylic acid moiety, which acts as the chelating moiety for the chelating polyether polyol. For the various embodiments, the acyl groups of the dianhydride moiety chemically react (e.g., an acetylation reaction) with any of the hydroxyl and/or amine (primary and/or secondary amine) of the liquid polyether polyol. Such reactions can take place at atmospheric pressure (e.g., 101.23 KPa) and in a temperature range of 20 to 150° C. with optional basic catalyst (e.g. potassium hydroxide, potassium hydride, sodium hydroxide, sodium hydride). Reaction times can range from 5 minutes up to 24 hours.

For the embodiments, the chelating agent having the dianhydride moiety can chemically react with the liquid polyether polyol at a mole ratio of 1:1.5 to 1:100 (moles chelating agent: moles polyether polyol) to form the chelating polyether polyol having an aminopolycarboxylic acid moiety, which acts as the chelating moiety for the chelating polyether polyol. Preferably, the chelating agent having the dianhydride moiety can chemically react with the liquid polyether polyol at a mole ratio of 1:3 to 1:50 (moles chelating agent: moles polyether polyol) to form the chelating polyether polyol having an aminopolycarboxylic acid moiety. Most preferably, the chelating agent having the dianhydride moiety can chemically react with the liquid polyether polyol at a mole ratio of 1:5 to 1:20 (moles chelating agent: moles polyether polyol) to form the chelating polyether polyol having an aminopolycarboxylic acid moiety.

In additional embodiments, the chelating agent having the amino based chelating moiety chemically reacts with the monomers used in forming the liquid polyester polyol or the liquid polyester polyol formed from the monomers to form a polyesteraminopolyol as the chelating polyester polyol. For the various embodiments, the acid or alcohol groups of the amino based chelating moiety (e.g., an aminopolycarboxylic acid containing one or more nitrogen atoms connected through carbon atoms to two or more carboxyl groups or a polyaminoalcohol with at least two nitrogen atoms connected through carbon atoms to a least one alcohol group and up to five alcohol groups) can undergo an esterification reaction with the hydroxyl groups if an acid or esterification/transesterification reaction with the carboxylic acid (including its derivatives) if an alcohol of either the monomers used in forming the liquid polyester polyol or the liquid polyester polyol formed from the monomers to form a polyesteraminopolyol as the chelating polyester polyol. Such reactions can take place at atmospheric pressure (e.g., 101.23 KPa), subatmospheric pressure (e.g. 1 KPa) or superatmospheric pressure (e.g. 200 KPa) and in a temperature range of 50 to 150° C. for aminopolycarboxylic acids and in a temperature range of 100 to 300° C. for polyaminoalcohols. Reaction times can range from 0.5 hours up to 24 hours.

For the embodiments, the metal compound is selected from the group consisting of a hydroxide, a carbonate, a carboxylate, a basic carbonate, a nitrate, a chloride, a metal salt and combinations thereof and the metal ion is selected from the periodic table metals of Group 2, 3, 4, 5, 6, 7, 8, 9, 10, 11, 12, 13 and Period 3, 4, 5 and combinations thereof (IUPAC Periodic Table of the Elements, 28 Nov. 2016) along with barium, mercury, lead, and thorium. Preferably, the metal ion is from the group consisting of copper, zinc, silver, iron, manganese, cobalt, nickel, zirconium, calcium, aluminum, barium, cadmium, gallium, indium, lead, magnesium, mercury, palladium, scandium, strontium, thorium, titanium, vanadium and combinations thereof. Preferably, the metal compound is a transition metal compound and the transition metal ion is selected from the group consisting of copper, zinc, silver, iron, manganese, cobalt, nickel, zirconium, cadmium, mercury, palladium, titanium, vanadium and combinations thereof. More preferably, the transition metal is from the group consisting of copper, zinc, silver, iron, manganese, cobalt, nickel, zirconium, and combinations thereof. Most preferably, the transition metal is from a group consisting of copper, zinc, iron, manganese, cobalt, nickel, and combinations thereof. In an additional most preferred embodiment, the metal compound is selected from the group consisting of a hydroxide, a carbonate, a carboxylate, a metal salt and combinations thereof and the metal ion is selected from the group consisting of copper, zinc, silver, iron, manganese, cobalt, nickel, zirconium, calcium, aluminum, barium, cadmium, gallium, indium, lead, magnesium, mercury, palladium, scandium, strontium, thorium, titanium, vanadium and combinations thereof.

Examples of the metal compound salts and calcium salts include copper (II) 2-ethylhexanotate, copper (II) hydroxide, copper (II) carbonate, copper (II) acetate, copper (I) acetate, copper butyrate, di-μ-hydroxo-bis[(N,N,N',N'-tetramethylethylenediamine)copper(II)] chloride, basic copper (II) carbonate, copper basic carbonate, calcium acetate, zinc stannate, zinc hydroxystannate, zinc (II) acetate, zinc (II) nitrate, zirconium (IV) hydroxide, cobalt (II) acetate, cobalt (II) chloride, cobalt (II) nitrate, nickel (II) acetate, nickel (II) chloride, nickel (II) nitrate, silver (I) acetate, silver (I) nitrate, manganese (II) 2-ethylhexanoate, and combinations thereof. Preferably, the metal compound is selected from the group consisting of copper (II) hydroxide, copper (II) carbonate, copper (II) acetate, copper (II) acetate monohydrate, and combinations thereof. Preferably, the metal compound is selected from the group consisting of copper (II) hydroxide, copper (II) carbonate, basic copper (II) carbonate, copper (II) acetate, cobalt (II) acetate, nickel (II) acetate, silver (I) acetate, zinc (II) acetate, calcium (II) acetate and combinations thereof.

The chelating moiety of the chelating polyester polyol and/or the chelating moiety of the chelating polyether polyol chelates the metal ion from the metal compound to form the metal chelated polyester polyol liquid or the metal chelated polyether polyol liquid, respectively. Preferably, the metal chelated polyester polyol liquid or the metal chelated polyether polyol liquid has a mole ratio of the metal ion to the chelating moiety of 0.05:1 to 2:1. More preferably, the metal chelated polyester polyol liquid or the metal chelated polyether polyol liquid has a mole ratio of the metal ion to the chelating moiety of 0.2:1 to 1.5:1. Most preferably, the metal chelated polyester polyol liquid or the metal chelated polyether polyol liquid has a mole ratio of the metal ion to the chelating moiety of 0.4:1 to 1:1. Such reactions can take place at atmospheric pressure (e.g., 101.23 KPa) and in a temperature range of 50 to 150° C. Reaction times range from 0.5 hours up to 48 hours.

The present disclosure also provides for an isocyanate-reactive composition having a hydroxyl moiety for forming a polyurethane polymer. For the embodiments, the isocyanate-reactive composition includes 0.1 to 100 weight percent of either the metal chelated polyester polyol liquid, the metal chelated polyether polyol liquid or a combination of both the metal chelated polyester polyol liquid and the metal chelated polyether polyol liquid, each as provided herein, and optionally up to 99.9 weight percent of a polyol to form the isocyanate-reactive composition, the weight percent based on the total weight of the isocyanate-reactive composition. For the various embodiments, the polyol used with the metal chelated polyester polyol liquid and/or metal chelated polyether polyol liquid to form the isocyanate-reactive composition can be selected from the group consisting of a polyether polyol, a polyester polyol, polycarbonate polyol, a polyethercarbonate polyol and combinations thereof. The polyol can have a number average molecular weight of 100 g/mol to 10,000 g/mol. Other number average molecular weight values may also be possible. For example, the polyol can have a number average molecular weight from a low value of 100, 200, 300, 350 or 400 g/mol to an upper value of 500, 750, 1,000, 2,000 or 10,000 g/mol. The number average molecular weight values reported herein are determined by end group analysis, gel permeation chromatography, and other methods as is known in the art. The polyol used with the used with the metal chelated polyester polyol liquid and/or metal chelated polyether polyol liquid to form the isocyanate-reactive composition can also include an aromatic moiety. As used herein, an "aromatic moiety" is at least one cyclically conjugated molecular moiety in the form of a planar unsaturated ring of carbon atoms that is covalently attached to the polyol compound. The planar unsaturated ring of carbon atoms can have at least six (6) carbon atoms.

For the embodiments, the polyether polyol can include those having at least 2, such as 2 or 3 hydroxyl groups per molecule and may be prepared, for example, by polymerization of oxiranes/cyclic ethers, such as ethylene oxide, propylene oxide, butylene oxide, styrene oxide or epichlorohydrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines. Examples of suitable starting components include ethylene glycol, propylene glycol-(1,3) or -(1,2), glycerol, trimethylolpropane, 4,4'-dihydroxy-diphenylpropane, aniline, diethanolamine, triethanolamine or ethylene diamine. Sucrose-based polyether polyols may also be used. It is in many cases preferred to use polyethers which contain predominant amounts of primary OH groups (up to 100%, by weight, based on all the OH groups present in the polyether).

For some of the embodiments, the polyester polyol can include those having at least 1.8, 2 or up to 3 hydroxyl groups per molecule (average number). Examples of such polyester polyols can include those formed as a reaction product of polyhydric, such as dihydric alcohols and/or trihydric alcohols, and polybasic, such as dibasic and/or tribasic, carboxylic acids. Instead of free polycarboxylic acids, the corresponding polycarboxylic acid anhydrides or corresponding polycarboxylic acid esters of lower alcohols or mixtures thereof may be used as well as their mixtures with free polycarboxylic acids. The polycarboxylic acids may be aliphatic, cycloaliphatic, aromatic and/or heterocyclic and they may be substituted, e.g. by halogen atoms, and/or may be unsaturated. Suitable exemplary polycarboxylic acids include, but are not limited to, succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids optionally mixed with monomeric fatty acids, dimethyl terephthalate and terephthalic acid-bis-glycol esters. Examples of other suitable polyester polyols include modified aromatic polyester polyols such as those provided under the trade designator STEPANPOL PS-2352 (acid number 0.6-1.0 mg KOH/g, hydroxyl number 230-250 mg KOH/g, hydroxyl functionality 2.0, Stepan Company).

Exemplary suitable polyhydric alcohols include, but are not limited to, ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxy-methylcyclohexane and other isomers), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as c-caprolactone, or hydroxycarboxylic acids, such as 6-hydroxycaproic acid, may also be used.

Such polyol components may also include polycarbonate polyols, such as the reaction product of diols, such as propanediol-(1,3), butanediol-(1,4) and/or hexanediol-(1,6), diethylene glycol, triethylene glycol or tetraethylene glycol, with diarylcarbonates, such as diphenylcarbonate, dialiphaticcarbonates, such as dimethylcarbonate or phosgene or from the reaction of oxiranes and carbon dioxide.

Other examples of suitable polyols include those polymers or copolymers formed with propylene oxide that have a hydroxyl equivalent weight of at least 75. The propylene oxide may be 1,3-propylene oxide, but more typically is 1,2-propylene oxide. If a copolymer, the comonomer is another copolymerizable alkylene oxide such as, for example, ethylene oxide, 2,3-butylene oxide, tetrahydrofuran, 1,2-hexane oxide, and the like. A copolymer may contain 25% or more by weight, 50% or more by weight, preferably 75% or more polymerized propylene oxide, based on the total weight of polymerized alkylene oxides. A copolymer preferably contains no more than 75%, especially no more than 50% by weight polymerized ethylene oxide. The polymer or copolymer of propylene oxide should have a nominal functionality of at least 2.0. The nominal functionality preferably is 2.5 to 8, more preferably 2.5 to 7 or 2.5 to 6. The hydroxyl equivalent weight of the polymer or copolymer of propylene oxide is at least 85, preferably at least 100, more preferably 150 to 3,200, in some embodiments 250 to 3,000 and in particular embodiments from 300 to 2,500. The polyol can also be formed of a blend, where the blend includes a blend of the diol and triol. The diol can have an average molecular weight (Mw) of 200 to 8,000 grams/mole and a triol having an average molecular weight (Mw) of 250 to 6,500 grams/mole.

In various embodiments, the polyol can have a hydroxyl number of from 10 mg KOH/g to 700 mg KOH/g. In still other embodiments, the polyol has a hydroxyl number of from 20 mg KOH/g to 500 mg KOH/g, or from 30 mg KOH/g to 350 mg KOH/g. As used herein, a hydroxyl number is the milligrams of potassium hydroxide equivalent to the hydroxyl content in one gram of the polyol or other hydroxyl compound. The polyol can also have a number averaged isocyanate reactive group functionality of 1.8 to 6, such as 2 to 4 or 2.2 to 3.0.

For the various embodiments, the polyether polyol and/or a polyester polyol can also be uncapped or capped using ethylene oxide (EO) and/or propylene oxide (PO), as known in the art, so as to provide hydrophilic or hydrophobic structures.

For the embodiments, the isocyanate-reactive composition can further include a compound selected from 0.1 wt. % to 1.5 wt. % of phosphorus from a flame-retardant compound, preferably a halogen-free flame-retardant compound, (the wt. % of phosphorus based on the overall weight of the isocyanate-reactive composition), 0.05 wt. % to 3.0 wt. % of the metal and a combination thereof, where the metal is from the metal chelated polyester polyol liquid and/or the metal chelated polyether polyol liquid and the wt. % of the metal is based on the overall weight of the isocyanate-reactive composition. Preferably, the isocyanate-reactive composition includes 0.5 wt. % to 1.0 wt. % of phosphorus from the halogen-free flame-retardant compound (the wt. % of phosphorus based on the overall weight of the isocyanate-reactive composition) and/or 0.15 wt. % to 2.0 wt. % of the metal from the metal chelated polyester polyol liquid and/or the metal chelated polyether polyol liquid (the wt. % of the metal based on the overall weight of the isocyanate-reactive composition). More preferably, the isocyanate-reactive composition includes 0.75 wt. % to 0.90 wt. % of phosphorus from the halogen-free flame-retardant compound (the wt. % of phosphorus based on the overall weight of the isocyanate-reactive composition) and/or 0.5 wt. % to 1.0 wt. % of the metal from the metal chelated polyester polyol liquid and/or the metal chelated polyether polyol liquid (the wt. % of the metal based on the overall weight of the isocyanate-reactive composition). For the given weight percent values, the isocyanate-reactive composition can have a molar ratio of the metal ion to phosphorus (mole metal ion:mole phosphorous) of 0.05:1 to 5:1. Preferably, the molar ratio of the metal ion to phosphorus (mole metal:mole phosphorous) is 0.10:1 to 3:1. More preferably, the molar ratio of the metal ion to phosphorus (mole metal:mole phosphorous) is 0.15:1 to 1:1.

For the embodiments provided herein, the flame-retardant compound, preferably a halogen-free flame-retardant compound, is selected from the group consisting of a phosphate, a phosphonate, a phosphinate and combinations thereof. Examples of the phosphate include trialkyl phosphate, triaryl phosphate, a phosphate ester and resorcinol bis(diphenyl phosphate). As used herein, a trialkyl phosphate has at least one alkyl group with 2 to 12 carbon atoms and optional halogen atoms. The other two alkyl groups of the trialkyl phosphate may, independently be the same or different than the first alkyl group, containing from one to 8 carbon atoms, including a linear or branched alkyl group, a cyclic alkyl group, an alkoxyethyl, a hydroxylalkyl, a hydroxyl alkoxyalkyl group, and a linear or branched alkylene group. Examples of the other two alkyl groups of the trialkyl phosphate include, for example, methyl, ethyl, propyl, butyl, n-propyl, isopropyl. n-butyl, isobutyl, sec-butyl, tert-butyl, butoxyethyl, isopentyl, neopentyl, isohexyl, isoheptyl, cyclohexyl, propylene, 2-methylpropylene, neopentylene, hydroxymethyl, hydroxyethyl, hydroxypropyl or hydroxybutyl. Blends of different trialkyl phosphates may also be used. The three alkyl groups of the trialkyl phosphate may be the same. The trialkyl phosphate can be tris(2-chloro-1-methylethyl) phosphate (TCPP), tris[2-chloro-1-(chloromethyl)ethyl] phosphate (TDCP), tris(p-tertiary-butylphenyl) phosphate (TBPP), and tris(2-chloroethyl) phosphate (TCEP). The trialkyl phosphate is desirably triethyl phosphate (TEP).

Examples of the phosphonate include diethyl (hydroxymethyl)phosphonate, dimethyl methyl phosphonate and diethyl ethyl phosphonate. Examples of the phosphinate include a metal salt of organic phosphinate such as aluminum methylethylphosphinate, aluminum diethylphosphinate, zinc methylethylphosphinate, and zinc diethylphosphinate. Examples of additional halogen-free flame-retardant compounds include resorcinoldiphosphoric acid, 9,10-dihydro-9-oxa-10-phosphaphenanthrene-10-oxide, ammonium polyphosphate and combinations thereof.

The present disclosure also provides for a process for preparing the metal chelated polyester polyol liquid and/or the metal chelated polyether polyol liquid. The process includes reacting monomers for a liquid polyester polyol or the liquid polyester polyol formed from the monomers for the liquid polyester polyol and a chelating agent having a chelating moiety to form a chelating polyester polyol, as discussed herein. For the embodiments, the chelating moiety is selected from a dianhydride moiety, an amino based chelating moiety and combinations thereof, as provided herein. For the embodiments, the chelating agent having the dianhydride moiety chemically reacts with the monomers for the liquid polyester polyol or the liquid polyester polyol formed from the monomers for the liquid polyester polyol to form the chelating polyester polyol having an aminopolycarboxylic acid moiety, as provided herein. For the embodiments, the chelating agent having the amino based chelating moiety chemically reacts with the monomers for the liquid polyester polyol or the liquid polyester polyol formed from the monomers for the liquid polyester polyol to form a polyesteraminopolyol as the chelating polyester polyol. For the embodiments, the process also includes reacting the chelating polyester polyol having the chelating moiety with a metal compound having a metal ion, where the chelating moiety of the chelating polyester polyol chelates the metal ion to form the metal chelated polyester polyol liquid, the reaction having a mole ratio of the metal ion to the chelating moiety of 0.05:1 to 2:1. For the embodiments, the chelating agent having the dianhydride moiety chemically reacts with the liquid polyester polyol formed from the monomers for the liquid polyester polyol at a mole ratio of 1:1.5 to 1:100 (moles chelating agent: moles polyester polyol) to form the chelating polyester polyol having the aminopolycarboxylic acid moiety.

The process can also include reacting monomers for a liquid polyether polyol or the liquid polyether polyol formed from the monomers for the liquid polyether polyol and a chelating agent having a chelating moiety to form a chelating polyether polyol, as discussed herein. For the embodiments, the chelating moiety is selected from a dianhydride moiety, an amino based chelating moiety and combinations thereof, as provided herein. For the embodiments, the chelating agent having the dianhydride moiety chemically reacts with the monomers for the liquid polyether polyol or the liquid polyether polyol formed from the monomers for the liquid polyether polyol to form the chelating polyether polyol having an aminopolycarboxylic acid moiety, as provided herein. For the embodiments, the chelating agent having the amino based chelating moiety chemically reacts with the monomers for the liquid polyether polyol or the liquid polyether polyol formed from the monomers for the liquid polyether polyol to form a polyetheraminopolyol as the chelating polyether polyol. For the embodiments, the process also includes reacting the chelating polyether polyol having the chelating moiety with a metal compound having a metal ion, where the chelating moiety of the chelating polyether polyol chelates the metal ion to form the metal chelated polyether polyol liquid, the reaction having a mole ratio of the metal ion to the chelating moiety of 0.05:1 to 2:1. For the embodiments, the chelating agent having the dianhydride moiety chemically reacts with the liquid polyether polyol formed from the monomers for the liquid polyether polyol at a mole ratio of 1:1.5 to 1:100 (moles chelating agent: moles polyether polyol) to form the chelating polyether polyol having the aminopolycarboxylic acid moiety.

The present disclosure also provides for a reaction mixture for forming a polyurethane polymer. The reaction mixture includes an isocyanate compound having an isocyanate moiety and the isocyanate-reactive composition as provided herein, where the reaction mixture has a molar ratio of the isocyanate moiety to the hydroxyl moiety of 0.90:1 to 7:1. For polyurethane rigid (PUR) and polyisocyanurate rigid (PIR) foams preferably the molar ratio of the isocyanate moiety to the hydroxyl moiety is 1.2:1 to 7:1, more preferably the molar ratio of the isocyanate moiety to the hydroxyl moiety is 1.5:1 to 5:1 and most preferably the molar ratio of the isocyanate moiety to the hydroxyl moiety is 2:1 to 4:1. For flexible polyurethane foams, preferably the molar ratio of the isocyanate moiety to the hydroxyl moiety is 0.95:1 to 1.20:1, more preferably the molar ratio of the isocyanate moiety to the hydroxyl moiety is 0.98:1 to 1.10:1 and most preferably the molar ratio of the isocyanate moiety to the hydroxyl moiety is 1:1 to 1.08:1. For two component polyurethane adhesives, sealants, coatings, and elastomers, preferably the molar ratio of the isocyanate moiety to the hydroxyl moiety is 0.95:1 to 1.35:1, more preferably the molar ratio of the isocyanate moiety to the hydroxyl moiety is 0.98:1 to 1.10:1 and most preferably the molar ratio of the isocyanate moiety to the hydroxyl moiety is 1:1 to 1.05:1.

For the various embodiments, the isocyanate compound has a number average molecular weight of 150 g/mol to 750 g/mol. Other number average molecular weight values may also be possible. For example, the isocyanate reactive compound can have a number average molecular weight from a low value of 150, 200, 250 or 300 g/mol to an upper value of 350, 400, 450 or 500 g/mol. In some embodiments, when the isocyanate compound is an isocyanate prepolymer resulting from reaction of a isocyanate reactive compound with a molar excess of a polyisocyanate compound or polymeric isocyanate compound under conditions that do not lead to gelation or solidification, the isocyanate prepolymers can have a higher a number average molecular weight than 750 g/mol and can be calculated from the number average molecular weight of each component and their relative masses used in preparing the prepolymer. The number average molecular weight values reported herein are determined by end group analysis, gel permeation chromatography, and other methods as is known in the art. The isocyanate compound can be monomeric and/or polymeric, as are known in the art. In addition, the isocyanate compound can have an isocyanate equivalent weight of 80 to 1750. In certain embodiments, the isocyanate has a viscosity, at 25° C., of 5 to 50,000 mPa·s, when measured using a Brookfield DVE viscometer. Other viscosity values may also be possible. For example, the isocyanate reactive compound can have a viscosity value from a low value of 5, 10, 30, 60 or 150 mPa·s to an upper value of 500, 2500, 10,000 or 50,000 mPa·s, each measured at 25° C. using a Brookfield DVE viscometer.

As used herein, polymeric isocyanate compounds contain two or more than two —NCO groups per molecule. For the various embodiments, the polymeric isocyanate compound is selected from an aliphatic diisocyanate, a cycloaliphatic diisocyanate, an aromatic diisocyanate, a polyisocyanate, an isocyanate prepolymer and combinations thereof. For the various embodiments, the polymeric isocyanate compound has a number average molecular weight of 150 g/mol to 500 g/mol. In addition, the polymeric isocyanate compound can have an isocyanate equivalent weight of 70 to 150, and the so-called MDI products, which are a mixture of isomers of diphenylmethanediisocyanate (MDI) in monomeric MDI or the so-called polymeric MDI products, which are a mixture of polymethylene polyphenylene polyisocyanates in monomeric MDI.

Examples of the polymeric isocyanate compound of the present disclosure can include, but is not limited to, methylene diphenyldiisocyanate (MDI), polymethylene polyphenylisocyanate containing MDI, polymeric MDI (PMDI), 1,6 hexamethylenediisocyanate (HDI), 2,4- and/or 2,6-toluenediisocyanate (TDI), 1,5-naphthalene diisocyanate (NDI), tetramethylene-1,4-diisocyanate, cyclohexane-1,4-diisocyanate, hexahydrotoluene diisocyanate, hydrogenated MDI ($H_{12}$ MDI), methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate, methylene bicyclohexylisocyante (HMDI), isophoronediisocyanate (IPDI) and combinations thereof. Suitable isocyanates can also include other aromatic and/or aliphatic polyfunctional isocyanates. Aromatic diisocyanates include those containing phenyl, tolyl, xylyl, naphthyl, or diphenyl moiety, or a combination thereof, such as trimethylol propane-adducts of xylylene diisocyanate, trimethylol propane-adducts of toluene diisocyanate, 4,4'-diphenyldimethane diisocyanate (MDI), xylylene diisocyanate (XDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, and a combination thereof. Suitable aliphatic polymeric isocyanate compounds include trimers of hexamethylene diisocyanate, trimers of isophorone diisocyanate, biurets of hexamethylene diisocyanate, hydrogenated polymeric methylene diphenyl diisocyanate, hydrogenated methylene diphenyl diisocyanate, hydrogenated MDI, tetramethylxylol diisocyanate (TMXDI), 1-methyl-2,4-diisocyanato-cyclohexane, 1,6-diisocyanate-2,2,4-trimethyl-hexane, 1-isocyanatomethyl-3-isocyanato-1,5,5-trimethyl-cyclohexane,tetramethoxybutane 1,4-diisocyanate, butane 1,4-diisocyanate, hexane 1,6-diisocyanate, dicyclohexylmethane diisocyanate, cyclohexane 1,4-diisocyanate, and a combination thereof. Examples of other polymeric isocyanate compounds include additional aliphatic, cycloaliphatic, polycyclic or aromatic in nature such as hydrogenated xylene diisocyanate (HXDI), p-phenylene diisocyanate (PPDI), 3,3'-dimethyldiphenyl-4, 4'-diisocyanate (DDDI), 2,2,4-trimethylhexamethylene diisocyanate (TMDI), isophorone diisocyanate (IPDI), 4,4'-dicyclohexylmethane diisocyanate (H12MDI) and norbornane diisocyanate (NDI). As well as the isocyanates mentioned above, partially modified polyisocyanates including uretdione, isocyanurate, carbodiimide, uretonimine, allophanate or biuret structure, and combinations thereof, among others, may be utilized. The polyols as provided herein may be pre-reacted with the organic polyisocyanate to form a prepolymer or quasi-prepolymer which contains isocyanate groups. The prepolymer or quasi-prepolymer may have an isocyanate content of, for example, 1 to 20 percent by weight. The isocyanate content for prepolymer or quasi-prepolymer in some embodiments is at least 2.5% or at least 4% and up to 15%, up to 12% or up to 10%.

For the embodiments, the reaction mixture further can further include compounds selected from the group consisting of water, a catalyst, a surfactant a blowing agent or combinations thereof. The reaction mixture can also include other components, as are known in the art. The catalyst can be present in an amount of 0.01 to 1.5 wt. % based on the total weight of the reaction mixture. The catalyst can be selected from the group consisting of an organic tertiary amine, tertiary phosphines, potassium acetates, a urethane-based catalyst and combinations. The catalyst can also include organo-tin compounds, as are known in the art.

The catalyst may be a blowing catalyst, a gelling catalyst, a trimerization catalyst, or combinations thereof. As used herein, blowing catalysts and gelling catalysts, may be differentiated by a tendency to favor either the urea (blow) reaction, in the case of the blowing catalyst, or the urethane (gel) reaction, in the case of the gelling catalyst. A trimerization catalyst may be utilized to promote the isocyanurate reaction in the compositions. Blowing catalysts and gelling catalysts are both utilized in preparation of rigid and flexible polyurethane foams. Polyurethanes that are not foams or microcellular such as many coating, adhesive, sealant and elastomers utilize gelling catalysts.

Examples of blowing catalysts, e.g., catalysts that may tend to favor the blowing reaction include, but are not limited to, short chain tertiary amines or tertiary amines containing an oxygen. The amine based catalyst may not be sterically hindered. For instance, blowing catalysts include bis-(2-dimethylaminoethyl)ether; pentamethyldiethylenetriamine, triethylamine, tributyl amine, N,N-dimethylaminopropylamine, dimethylethanolamine, N,N,N',N'-tetramethylethylenediamine, and combinations thereof, among others. An example of a commercial blowing catalyst is POLYCAT™ 5, from Evonik, among other commercially available blowing catalysts.

Examples of gelling catalysts, e.g., catalyst that may tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, triethylenediamine, 4.4'(oxydi-2,1-ethanediyl)bismorpholine, and combinations thereof. Examples of a commercially available gelling catalysts are POLYCAT™ 8 and DABCO® T-12 from Evonik, among other commercially available gelling catalysts.

Examples of trimerization catalysts include N,N,N',N", N"-pentamethyldiethylenetriamine (PMDETA); N,N',N"-Tris(3-dimethylaminopropyl)hexahydro-S-triazine; N,N-dimethylcyclo-hexylamine; 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof, among others. Some commercially available trimerization catalysts include DABCO® TMR-2, TMR-7, DABCO® K 2097; DABCO® K15, POLYCAT™ 41, and POLYCAT™ 46, each from Evonik, among other commercially available trimerization catalysts.

For the various embodiments, the blowing agent can be present in an amount of 1.0 to 15 wt. % based on the total weight of the reaction mixture. In addition to the other blowing agents provided herein, blowing agents, as are known in the art, can be selected from the group consisting of water, volatile organic substances, dissolved inert gases and combinations thereof. Examples of blowing agents include hydrocarbons such as butane, isobutane, 2,3-dimethylbutane, n- and i-pentane isomers, hexane isomers, heptane isomers and cycloalkanes including cyclopentane, cyclohexane, cycloheptane; hydroflurocarbons such as HCFC-142b (1-chloro-1,1-difluoroethane), HCFC-141b (1,1-dichloro-1-fluoroethane), HCFC-22 (chlorodifluoromethane), HFC-245fa (1,1,1,3,3-pentafluoropropane), HFC-365mfc (1,1,1,3,3-penta-fluorobutane), HFC 227ea (1,1,1,2, 3,3,3-heptafluoropropane), HFC-134a (1,1,1,2-tetrafluoroethane), HFC-125 (1,1,1,2,2-pentafluoroethane), HFC-143 (1,1,2-trifluoroethane), HFC 143A (1,1,1-trifluoroethane), HFC-152 (1,1-difluoroethane), HFC-227ea (1,1, 1,2,3,3,3-heptafluoropropane), HFC-236ca(1,1,2,2,3,3-hexafluoropropane), HFC 236fa (1,1,1,3,3,3-hexafluoroethane), HFC 245ca (1,1,2,2,3-pentafluoropentane), HFC 356mff (1,1,1,4,4,4-hexafluorobutane), HFC 365mfc (1,1,1,3,3-pentafluorobutane); hydrofluoroolefins such as cis-1,1,1,4, 4,4-hexafluoro-2-butene, 1,3,3,3-Tetrafluoropropene, trans-1-chloro-3,3,3-trifluoropropene; a chemical blowing agent such as formic acid and water. The blowing agent can be other volatile organic substances such as ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane; butane; hexane; heptane; diethyl ether; as well as the gases of nitrogen, air, and carbon dioxide.

For the various embodiments, the surfactant agent can be present in an amount of 0.1 to 10 wt. % based on the total weight of the reaction mixture. Examples of suitable surfactants include silicone-based surfactants and organic-based surfactants. Some representative materials are, generally, polysiloxane polyoxyalkylene block copolymers, such as those disclosed in U.S. Pat. Nos. 2,834,748; 2,917, 480; and 2,846,458, the disclosures of which are incorporated herein by reference in their entireties. Also included are organic surfactants containing polyoxyethylene-polyoxybutylene block copolymers, as are described in U.S. Pat. No. 5,600,019, the disclosure of which is incorporated herein by reference in its entirety. Other surfactants include polyethylene glycol ethers of long-chain alcohols, tertiary amine or alkanolamine salts of long-chain allyl acid sulfate esters, alkylsulfonic esters, alkyl arylsulfonic acids and combinations thereof.

The water can be present in the reaction mixture in an amount of 0.1 to 1.5 wt. % based on the total weight of the reaction mixture.

The reaction mixture can further include a filler along with other additives in addition to water, a catalyst, a blowing agent, a surfactant and combinations thereof. The total amount of such other additives may be from 0.01 wt. % to 30.0 wt. %. The use of other additives for polyurethane polymer compositions are also known and may be used with the present disclosure.

For the embodiments, the reaction mixture provided herein can be used to form a polyurethane-based polymer, including a polyurethane-based polymer foam. Processes for preparing the reaction mixture for producing a polyurethane-based foam can be achieved through any known process techniques in the art. In general, the polyurethane-based foam of the present disclosure may be produced by discontinuous or continuous processes, including the process referred to generally as the discontinuous panel process (DCP) and continuous lamination, with the foaming reaction and subsequent curing being carried out in molds or on conveyors. The process as provided herein can be performed at a temperature from 15° C. to 80° C. Mixing pressures for the process can include values of 80 kPa to 25,000 kPa. The admixing of the components for the polyurethane-based foam can be performed using a mixing device as are known in the art. The density of the resulting polyurethane foam may be 10 kg/m$^3$ or more, preferably 15 kg/m$^3$ or more, more preferably 25 kg/m$^3$ or more, most preferably 35 kg/m$^3$ or more, and at the same time typically 200 kg/m$^3$ or less, preferably 100 kg/m$^3$ or less, more preferably 70 kg/m$^3$ or less, and still most preferably 50 kg/m$^3$ or less.

The polyurethane-based foam of the present disclosure offers low smoke generation and high thermal stability determined according to ASTM E662 "Test Method for Specific Optical Density of Smoke Generated by Solid Materials". Lower values of Maximum Specific Optical Density (Max Ds) mean lower smoke generation. Lower values of mass loss % mean greater thermal stability. The Max Ds may be 400 or less, preferably 200 or less, more preferably 100 or less, and still most preferably 50 or less. The mass loss % may be 50% or less, preferably 45% or less, more preferably 40% or less, and still most preferably 30% or less.

Polyurethane-based foams of the present disclosure may have low thermal conductivity in applications such as for building insulation. Thermal conductivity of rigid foams is expressed by the K-factor. The K-factor is a measurement of the insulating properties. The K factor of the prepared foams may be 30.0 mW/mK or less, preferably 27.0 mW/mK or less, more preferably 24.0 mW/mK or less, and still most preferably 22.0 mW/mK or less. Thermal conductivity (K-Factor) was measured using ASTM C-518-17 at mean temperature of 75° F.

The applications for the polyurethane-based foams produced by the present disclosure are those known in the industry. For example, the polyurethane-based foams can be used for insulation used in building wall and roofing, in garage doors, in shipping trucks and railcars, and in cold storage facilities. The polyurethane-based foams disclosed herein may have a combination of properties that are desirable for these applications. For instance, the polyurethane-based foams disclosed herein may advantageously provide desirable low thermal conductivity, smoke density, thermal stability, and improved combustion characteristics with reduced HCN and CO emission.

The metal chelating polyols and the polyurethane polymers of this disclosure can also be useful, for example, as flexible foams, coatings, elastomers, sealants, binders, or adhesives. For use as a coating, elastomer, sealant, binder or adhesive, the reactants preferably are formulated into a two-component system (2K), one component containing the polyisocyanate (more preferably an isocyanate-terminated prepolymer or quasi-prepolymer) and the other component containing at least one of the metal chelated polyester polyol liquid and/or metal chelated polyether polyol liquid with the metal chelating polyol imparting antifungal, antimicrobial, odor resistance, hardness, friction resistance, and the like to the cured polyurethane product. For use as a coating, elastomer, sealant, binder or adhesive, the metal chelating polyol with other optional polyols may be pre-reacted with the organic polyisocyanate to form a prepolymer or quasi-prepolymer which contains isocyanate groups and utilized as one-component (1K) curing systems.

Some embodiments of the disclosure will now be described in detail in the following Examples.

EXAMPLES

Some embodiments of the present disclosure will now be described in detail in the following Examples, wherein all parts and percentages are by weight unless otherwise specified. In the Examples, the following materials and tests are used.

Materials

Materials employed in the examples and/or comparative examples include the following.

Polyol A is a polyester polyol (an aromatic polyester polyol from terephthalic acid, polyethylene glycol 200, and diethylene glycol), having a hydroxyl number of 220 mg KOH/g and a functionality of 2.

Polyol B is a polyester polyol (an aromatic polyester polyol from terephthalic acid, polyethylene glycol 200, glycerol, and diethylene glycol), having a hydroxyl number of 315 mg KOH/g and a functionality of 2.4.

Polyethylene Glycol 200 (PEG 200) available from TCI America.

Polyethylene Glycol 400 (PEG 400) available from TCI America.

N,N,N',N'-Tetrakis-(2-hydroxypropyl)ethylenediamine available from TCI America.

2[[2-(Dimethylamino)ethyl] methylamino]ethanol available from TCI America.

1-[Bis[3-(dimethylamino)propyl]amino-2-propanol] available from Sigma-Aldrich.

Glycerol available from Acros Organics.

TYZOR® AA105 (catalyst) available from Dorf Ketal Chemicals.

2,2'-Bipyridine (BIPY) available from Sigma-Aldrich.

N,N,N',N'-Tetramethylethylenediamine (TMEDA) available from TCI America.

Triethyl phosphate (TEP) is a fire retardant from LANXESS.

Meso-butane-1,2,3,4-tetracarboxylic dianhydride from TCI America.

POLYCAT™ 5 is a catalyst from Evonik Industries AG.

POLYCAT™ 46 is a catalyst from Evonik Industries AG.

Ethylenediaminetetraacetic Dianhydride available from TCI America.

Diethylenetriaminepentaacetic dianhydride available from TCI America.

Surfactant is a silicone rigid foam surfactant from Evonik Industries AG.

Water is deionized water having a specific resistance of 10 MΩ×cm (million ohms) at 25° C.

Cyclopentane (c-Pentane) is a blowing agent from Sigma-Aldrich.

Diethyl (hydroxymethyl)phosphonate (DEHMP) is a fire retardant from Tokyo Chemical Industry Co., Ltd.

PAPI™ 580N is a polymethylene polyphenylisocyanate containing methylene diphenyl diisocyanate (MDI) with 30.8% isocyanate from Dow Inc.

Copper (II) hydroxide (Cu(OH)2), technical grade, available from Sigma Aldrich.

Copper (I) oxide (Cu2O), technical grade, available from Sigma Aldrich.

Copper carbonate, basic, available from Sigma Aldrich.

Ethylhexanoate copper (II) (CuEH) available from Sigma Aldrich.

Copper (II) acetate monohydrate ($Cu(OAc)_2\ H_2O$) available from Acros Organics.

Cobalt (II) acetate tetrahydrate ($Co(OAc)_2\ 4H_2O$) available from Acros Organics.

Nickel (II) acetate tetrahydrate ($Ni(OAc)_2\ 4H_2O$) available from Acros Organics.

Silver (I) acetate (Ag(OAc)) available from Fisher Scientific.

Zinc (II) acetate dihydrate ($Zn(OAc)_2\ 2H_2O$) available from Fisher Scientific.

Calcium (II) acetate monohydrate ($Ca(OAc)_2\ H_2O$) available from Acros Organics.

Preparation of Non-Chelating Polyesterpolyol

Polyester Polyol Containing Butanedianhydride and Copper (II) Hydroxide (for C Ex A)

Load polyester Polyol A (85.0 grams, OH#220 mg KOH/g) into a dry 3-neck 250 mL round-bottom flask positioned in a heating mantle and place under an initial nitrogen ($N_2$, gas) sweep with overhead stirring. Warm the flask to 100° C. Add meso-butane-1,2,3,4-tetracarboxylic dianhydride in two portions of 3.07 g (first portion) and 2.99 g (second portion) having a hold time of 30 min. after the first addition and 1.75 hours after the second addition. Add copper (II) hydroxide in two portions of 1.44 g (first portion) and 1.33 g (second portion) having a hold time of 60 minutes after the first addition and 2.0 hours after the second addition. Solid particles of copper (II) hydroxide are observed in the reactor product. Raise the temperature to 120° C. for a total of 8 hours with solid particles of copper (II) hydroxide observed in the reactor product. Raise the temperature to 140° C. for 2 hours with solid particles of copper (II) hydroxide observed in the reactor product. Raise the temperature to 160° C. for 3 hours with gel-like particles observed in the reactor product.

Preparation of Liquid Chelated Metal Polyol

Liquid Chelated Metal Polyol C

Load polyester Polyol A (85.99 grams, OH #220 mg KOH/g) into a dry 3-neck 250 mL round-bottom flask positioned in a heating mantle and place under an initial nitrogen ($N_2$, gas) sweep with overhead stirring. Warm the flask to 100° C. Add ethylenediaminetetraacetic dianhydride in two portions of 4.096 g (first portion) and 3.839 g (second portion) having a hold time of 30 minutes after the first addition and 60 minutes after the second addition. Cool the content of the flask to 60° C. Add basic copper (II) carbonate in two portions of 1.713 g and 1.712 g with a hold time of 60 minutes after the $1^{st}$ addition and 6 hours after the $2^{nd}$ addition. Next, heat the content of the flask to 80° C. and hold at this temperature for 2 hours after which heat the content of the flask to 100° C. and hold at this temperature for 16 hours and then heat the content of the flask to 120° C. and hold at this temperature for 6 hours. The product is a blue, viscous liquid. Cool the product to 60° C. and dilute with stirring using polyester Polyol B (28.63 grams, OH #315 mg KOH/gram) and triethyl phosphate (20.25 grams) with a hold time with stirring of 16 hours at 60° C. before cooling to room temperature (23° C.).

Liquid Chelated Metal Polyol D

Load polyester polyol A (170.49 grams, OH #220 mg KOH/g) into a dry 3-neck 500 mL round-bottom flask positioned in a heating mantel and place under an initial nitrogen ($N_2$, gas) sweep with overhead stirring. Warm the flask to 100° C. Add ethylenediaminetetraacetic dianhydride in three portions of 5.047 g (first portion), 5.233 g (second portion) and 5.450 g (third portion) having hold times of 30 minutes after the first and second addition and 60 minutes after the third addition. Remove a 4.26 g sample aliquot. Add copper (II) hydroxide in three portions of 2.078 g (first portion), 1.918 g (second portion) and 1.858 g (third portion) having hold times of 30 minutes after the first and second additions and 5.75 hours after the third addition with a 7.44 g aliquot removed and cooled to room temperature. Product has an acid number of 2.05 mg KOH/gram and is a clear blue, viscous liquid. Warm the product to 60° C. and dilute by stirring with polyester polyol B (53.3 grams, OH #315 mg KOH/gram) and triethyl phosphate (37.6 grams) with a hold time with stirring of 2.5 hours at 40° C. before cooling to room temperature.

Liquid Chelated Metal Polyol E

Load polyethylene glycol 200 (100 grams, Mn 201) into a dry 3-neck 250 mL round-bottom flask positioned in a heating mantel and place under an initial nitrogen ($N_2$, gas) sweep with overhead stirring. Warm the flask to 100° C. Add ethylenediaminetetraacetic dianhydride in three portions of 3.105 g (first portion), 3.095 g (second portion) and 3.026 g (third portion) having hold times of about 25 minutes after the first and second addition and about 75 minutes after the third addition. Add copper (II) hydroxide in three portions of 1.086 g (first portion), 1.105 g (second portion) and 1.243 g (third portion) having hold times of 30 minutes after the first and second additions and 3.25 hours after the third addition. Cool the product to room temperature. The product is a clear blue, viscous liquid.

Liquid Chelated Metal Polyol F

Load N,N,N',N'-tetrakis-(2-hydroxypropyl)ethylenediamine (8.85 grams) and Polyol A (120.00 g) into a dry 3-neck 250 mL round-bottom flask positioned in a heating mantel and place under an initial nitrogen ($N_2$, gas) sweep with overhead stirring. Warm the flask to 180° C. with TYZOR® AA105 (0.0430 grams) injected upon approaching temperature and stir for 2 hours. Cool the content of the flask to 100° C. Add Copper (II) acetate monohydrate in two portions of 2.779 g and 2.961 g with a 1 hour hold time after the first addition and a 2 hour hold time after the second addition. Cool the product to room temperature. Product is a clear, blue viscous liquid.

Liquid Chelated Metal Polyol G

Load polyethylene glycol 200 (348.33 grams, Mn 200), terephthalic acid (199.33 grams), and TYZOR AA 105 (0.1374 grams) into an insulated 4-neck, 1000 mL round bottom flask with $N_2$ inlet adaptor with thermocouple, overhead stirring with flask sitting in a heating mantle. After degassing by cycling between vacuum (100 Torr) and $N_2$, complete the reactor with heat traced and insulated Dean-stark type trap and condenser attached to outlet adaptor with $N_2$ sweep exiting via oil bubbler. Reaction profile with distillate collected is 220° C. for 4.5 hours, 230° C. for 4 hours, 240° C. for 3 hours, and 250° C. for 4.5 hours with polyethylene glycol 200 (28 grams, Mn 200) added as the polyester polyol cools.

Load N,N,N',N'-tetrakis-(2-hydroxypropyl)ethylenediamine (20.61 grams) and polyester polyol described in this example (122.0 grams) into a dry 3-neck 250 mL round-bottom flask positioned in a heating mantle and place under an initial nitrogen ($N_2$, gas) sweep with overhead stirring then switch to positive nitrogen ($N_2$, gas). Warm the flask to 180° C. with TYZOR® AA105 (0.0472 grams) injected upon approaching temperature and stir for 4 hours. The hydroxyl number of this material is 214 mg KOH/g. Cool the contents of the flask to 100° C. Add Copper (II) acetate monohydrate in two portions of 3.505 g and 3.384 g with a 1 hour hold time after the first addition and a 1 hour hold time after the second addition. Cool the product to room temperature. Product is a clear, blue viscous liquid.

Liquid Chelated Metal Polyol H

Load 1-[bis[3-(dimethylamino)propyl]amino-2-propanol] (8.64 grams), glycerol (3.24 grams) and Polyol A (131.08 grams) into a dry 3-neck 250 mL round-bottom flask positioned in a heating mantel and place under an initial nitrogen ($N_2$, gas) sweep with overhead stirring then switch to positive nitrogen ($N_2$, gas). Warm the flask to 180° C. with TYZOR® AA 105 (0.0467 grams) injected upon approaching temperature and stir for 4 hours. Hydroxyl number is 282 mg KOH/gram. Cool the content of the flask to 100° C. Add Copper (II) acetate monohydrate in two portions of 3.521 grams and 3.312 grams with a 1 hour hold time after the first addition and a 1 hour hold time after the second addition. Cool the product to room temperature. Product is a clear, blue viscous liquid.

Liquid Chelated Metal Polyol I

Load 2-[[2-(dimethylamino)ethyl] methylamino]ethanol (5.14 grams), glycerol (3.24 grams) and Polyol A (134.60 grams) into a dry 3-neck 250 mL round-bottom flask positioned in a heating mantel and place under an initial nitrogen ($N_2$, gas) sweep with overhead stirring, then switch to positive nitrogen ($N_2$, gas). Warm the flask to 165° C. with TYZOR® AA105 (0.0431 grams) injected upon approaching temperature and stir for 3 hours. Hydroxyl number is 287 mg KOH/gram. Cool the content of the flask to 100° C. Add Copper (II) acetate monohydrate in two portions of 3.45 grams and 3.45 grams with a 1 hour hold time after the first addition and a 1.75 hour hold time after the second addition. Cool the product to room temperature. Product is a clear, blue-green viscous liquid.

Liquid Chelated Metal Polyol J

Load polyethylene glycol 400 (45.0 grams, Mn 407) into a dry 3-neck 100 mL round-bottom flask positioned in a heating mantel and place under an initial nitrogen ($N_2$, gas) sweep with overhead stirring. Warm the flask to 75° C. Add diethylenetriaminepentaacetic dianhydride in three portions of 1.451 g (first portion), 1.379 g (second portion) and 1.120 g (third portion); first portion is mixed for 1 hour at 75° C. and then 1 hour at 100° C., the second and third portions are added at 100° C. having hold times of about 1 hour after the second and third addition. Add copper (II) hydroxide in two portions of 0.243 g (first portion), 0.225 g (second portion) having hold times of 1 hour after the first and second additions. Cool the product to room temperature. The product is a clear blue, viscous liquid.

Liquid Chelated Metal Polyol K

Load polyethylene glycol 200 (348.33 grams, Mn 200), terephthalic acid (199.33 grams), and TYZOR® AA105 (0.1374 grams) into an insulated 4-neck, 1000 mL round bottom flask with $N_2$ inlet adaptor with thermocouple, overhead stirring with flask sitting in a heating mantle. After degassing by cycling between vacuum (100 Torr) and $N_2$, complete the reactor with heat traced and insulated Dean-stark type trap and condenser attached to outlet adaptor with $N_2$ sweep exiting via oil bubbler. Reaction profile with distillate collected is 220° C. for 4.5 hours, 230° C. for 4 hours, 240° C. for 3 hours, and 250° C. for 4.5 hours with polyethylene glycol 200 (28 grams, Mn 200) added as the polyester polyol cools.

Load N,N,N',N'-tetrakis-(2-hydroxypropyl)ethylenediamine (42.24 grams) and polyester polyol described in this example (250.0 grams) into a dry 3-neck 500 mL round-bottom flask positioned in a heating mantle and place under an initial nitrogen ($N_2$, gas) sweep with overhead stirring, then degas with vacuum of 50 Torr/atmospheric pressure $N_2$(cycling 3 times) then switch to positive nitrogen ($N_2$, gas). Warm the flask to 180° C. with TYZOR® AA105 (0.1007 grams) injected upon approaching temperature and stir for 4 hours. The hydroxyl number of this material is 220 mg KOH/g. Cool the contents of the flask to 80° C. and transfer to bottle.

Load polyesteraminopolyol (prior paragraph. 60.0 grams) into a 3-neck, 100 mL round-bottom flask with flask positioned in a heating mantel and place under a nitrogen ($N_2$, gas) sweep with overhead stirring. Warm the flask to 100° C. Add cobalt (II) acetate tetrahydrate in three portions of 2.51 g, 2.30 g, and 2.21 g with a 1 hour hold time after the first addition and second addition and a 1.25 hour hold time after the third addition. Cool the product to room temperature. Product is a clear, deep purple, viscous liquid.

Liquid Chelated Metal Polyol L

Load polyethylene glycol 200 (348.33 grams, Mn 200), terephthalic acid (199.33 grams), and TYZOR® AA 105 (0.1374 grams) into an insulated 4-neck, 1000 mL round bottom flask with $N_2$ inlet adaptor with thermocouple, overhead stirring with flask sitting in a heating mantle. After degassing by cycling between vacuum (100 Torr) and $N_2$, complete the reactor with heat traced and insulated Dean-stark type trap and condenser attached to outlet adaptor with $N_2$ sweep exiting via oil bubbler. Reaction profile with distillate collected is 220° C. for 4.5 hours, 230° C. for 4 hours, 240° C. for 3 hours, and 250° C. for 4.5 hours with polyethylene glycol 200 (28 grams, Mn 200) added as the polyester polyol cools.

Load N,N,N',N'-tetrakis-(2-hydroxypropyl)ethylenediamine (42.24 grams) and polyester polyol described in this example (250.0 grams) into a dry 3-neck 500 mL round-bottom flask positioned in a heating mantle and place under an initial nitrogen ($N_2$, gas) sweep with overhead stirring, then degas with vacuum of 50 Torr/atmospheric pressure $N_2$(cycling 3 times) then switch to positive nitrogen ($N_2$, gas). Warm the flask to 180° C. with TYZOR® AA105 (0.1007 grams) injected upon approaching temperature and stir for 4 hours. The hydroxyl number of this material is 220 mg KOH/g. Cool the contents of the flask to 80° C. and transfer to bottle.

Load polyesteraminopolyol (prior paragraph. 60.0 grams) into a 3-neck, 100 mL round-bottom flask with flask positioned in a heating mantel and place under a nitrogen ($N_2$, gas) sweep with overhead stirring. Warm the flask to 100° C.

Add nickel (II) acetate tetrahydrate in three portions of 2.568 g, 2.244 g, and 2.208 g with a 1 hour hold time after the first addition, second addition and the third addition. Cool the product to room temperature. Product is a clear, deep blue-green, viscous liquid.

Liquid Chelated Metal Polyol M

Load polyethylene glycol 200 (348.33 grams, Mn 200), terephthalic acid (199.33 grams), and TYZOR® AA105 (0.1374 grams) into an insulated 4-neck, 1000 mL round bottom flask with $N_2$ inlet adaptor with thermocouple, overhead stirring with flask sitting in a heating mantle. After degassing by cycling between vacuum (100 Torr) and $N_2$, complete the reactor with heat traced and insulated Deanstark type trap and condenser attached to outlet adaptor with $N_2$ sweep exiting via oil bubbler. Reaction profile with distillate collected is 220° C. for 4.5 hours, 230° C. for 4 hours, 240° C. for 3 hours, and 250° C. for 4.5 hours with polyethylene glycol 200 (28 grams, Mn 200) added as the polyester polyol cools.

Load N,N,N',N'-tetrakis-(2-hydroxypropyl)ethylenediamine (42.24 grams) and polyester polyol described in this example (250.0 grams) into a dry 3-neck 500 mL round-bottom flask positioned in a heating mantle and place under an initial nitrogen ($N_2$, gas) sweep with overhead stirring, then degas with vacuum of 50 Torr/atmospheric pressure $N_2$(cycling 3 times) then switch to positive nitrogen ($N_2$, gas). Warm the flask to 180° C. with TYZOR® AA105 (0.1007 grams) injected upon approaching temperature and stir for 4 hours. The hydroxyl number of this material is 220 mg KOH/g. Cool the contents of the flask to 80° C. and transfer to bottle.

Load polyesteraminopolyol (prior paragraph. 60.0 grams) into a 3-neck, 100 mL round-bottom flask with flask positioned in a heating mantel and place under a nitrogen ($N_2$, gas) sweep with overhead stirring. Warm the flask to 100° C. Add silver (I) acetate (1.680 grams) and after a 1 hour hold time have a clear, brown viscous, stirrable liquid.

Liquid Chelated Metal Polyol N

Load polyester polyol A (250.0 grams, OH #220 mg KOH/g) into a dry 3-neck 500 mL round-bottom flask positioned in a heating mantel and place under an initial nitrogen ($N_2$, gas) sweep with overhead stirring. Warm the flask to 100° C. Add ethylenediaminetetraacetic dianhydride in four portions of 5.122 grams (first portion), 4.842 grams (second portion), 4.739 grams (third portion), and 4.617 grams (fourth portion) having hold times of 30 minutes after the first, second, third addition and 60 minutes after the fourth addition. Product is cooled and transferred to bottle.

Load the chelating polyester polyol having an aminopolycarboxylic acid moiety (prior paragraph, 55.0 grams) into a 3-neck, 100 mL round-bottom flask with flask positioned in a heating mantel and place under a nitrogen ($N_2$, gas) sweep with overhead stirring. Warm the flask to 100° C. Add calcium (II) acetate monohydrate in two portions of 0.457 grams (first portion) and 0.448 grams (second portion) having 1 hour hold times after each addition. Cool the product to room temperature. Product is a gold, viscous liquid.

Liquid Chelated Metal Polyol O

Load polyester polyol A (250.0 grams, OH#220 mg KOH/g) into a dry 3-neck 500 mL round-bottom flask positioned in a heating mantel and place under an initial nitrogen ($N_2$, gas) sweep with overhead stirring. Warm the flask to 100° C. Add ethylenediaminetetraacetic dianhydride in four portions of 5.122 grams (first portion), 4.842 grams (second portion), 4.739 grams (third portion), and 4.617 grams (fourth portion) having hold times of 30 minutes after the first, second, third addition and 60 minutes after the fourth addition. Product is cooled and transferred to bottle.

Load the chelating polyester polyol having an aminopolycarboxylic acid moiety (prior paragraph, 55.0 grams) into a 3-neck, 100 mL round-bottom flask with flask positioned in a heating mantel and place under a nitrogen ($N_2$, gas) sweep with overhead stirring. Warm the flask to 100° C. Add zinc (II) acetate dihydrate in three portions of 1.187 grams (first portion), 1.169 grams (second portion), and 0.856 grams (third portion) having 1 hour hold times after each addition with an additional 1.5 hour hold time at 120° C. after the third addition. Cool the product to room temperature. Product is a gold, viscous liquid.

Liquid Chelated Metal Polyol P

Load polyester polyol A (250.0 grams, OH #220 mg KOH/g) into a dry 3-neck 500 mL round-bottom flask positioned in a heating mantel and place under an initial nitrogen ($N_2$, gas) sweep with overhead stirring. Warm the flask to 100° C. Add ethylenediaminetetraacetic dianhydride in four portions of 5.122 grams (first portion), 4.842 grams (second portion), 4.739 grams (third portion), and 4.617 grams (fourth portion) having hold times of 30 minutes after the first, second, third addition and 60 minutes after the fourth addition. Product is cooled and transferred to bottle.

Load the chelating polyester polyol having an aminopolycarboxylic acid moiety (prior paragraph, 55.0 grams) into a 3-neck, 100 mL round-bottom flask with flask positioned in a heating mantel and place under a nitrogen ($N_2$, gas) sweep with overhead stirring. Warm the flask to 75° C. Add silver (I) acetate in two portions of 0.684 grams (first portion) and 0.602 grams (second portion) having a 20 minute hold time after first addition and 1 hour hold time after the second addition. Cool the product to room temperature. Product is an amber, viscous liquid.

TABLE 1

Reaction Mixture for Polyisocyanurate Examples and Comparative Examples of Polyurethane-Based Molded Foams Using Liquid Chelated Transition Metal Polyols

| Component | C Ex A pbw | C EX B pbw | EX 1 pbw | EX 2 pbw | EX 3 pbw | EX 4 pbw |
|---|---|---|---|---|---|---|
| Formulated isocyanate-reactive composition | | | | | | |
| PEG200 | | 9.94 | | | | |
| Polyol A | 16.33 | | | | | |
| Polyol B | 5.44 | 2.48 | 5.74 | 5.75 | 4.72 | 2.45 |
| Polyol C | | | 19.51 | | | |
| Polyol D | | | | 19.43 | | |
| Polyol E | | | | | | 11.06 |

TABLE 1-continued

Reaction Mixture for Polyisocyanurate Examples and Comparative Examples of Polyurethane-Based Molded Foams Using Liquid Chelated Transition Metal Polyols

| Component | C Ex A pbw | C EX B pbw | EX 1 pbw | EX 2 pbw | EX 3 pbw | EX 4 pbw |
|---|---|---|---|---|---|---|
| Polyol F | | | | | 15.87 | |
| Triethyl phosphate (TEP) | 3.84 | 3.85 | 4.06 | 4.06 | 3.77 | 3.80 |
| POLYCAT ™ 5 catalyst | 0.26 | 0.26 | 0.54 | 0.27 | 0.05 | 0.26 |
| POLYCAT ™ 46 catalyst | 0.49 | 0.50 | 1.02 | 0.52 | 0.48 | 0.49 |
| silicon surfactant | 0.77 | 0.78 | 0.78 | 0.78 | 0.75 | 0.77 |
| Water | 0.20 | 0.20 | 0.21 | 0.21 | 0.19 | 0.20 |
| Cyclopentane | 5.38 | 5.47 | 5.42 | 5.43 | 5.28 | 5.40 |
| Isocyanate | | | | | | |
| PAPI ™ 580N | 67.28 | 76.52 | 63.50 | 63.56 | 68.92 | 75.57 |

TABLE 2

Reaction Mixture for Polyisocyanurate Examples and Comparative Examples of Polyurethane-Based Cup Foams Using Liquid Chelated Transition Metal Polyols

| Component | C Ex C pbw | EX 5 pbw |
|---|---|---|
| Formulated isocyanate-reactive composition | | |
| Polyol A | 16.33 | |
| Polyol B | 5.44 | 4.22 |
| Polyol H | | 15.19 |
| Triethyl phosphate (TEP) | 3.84 | 3.80 |
| POLYCAT ™ 5 catalyst | 0.26 | 0.26 |
| POLYCAT ™ 46 catalyst | 0.49 | 0.49 |
| silicon surfactant | 0.77 | 0.76 |
| Water | 0.20 | 0.20 |
| Cyclopentane | 5.38 | 5.37 |
| Isocyanate | | |
| PAPI ™ 580N | 67.28 | 69.71 |

Prepare the polyurethane-based molded foams as follows. For each Example (EX) and Comparative Example (C Ex) mix the components of the isocyanate-reactive composition provided in Table 1 in a beaker at 2,000 rpm with a rotary mixer for 10 seconds (s). Next, mix the isocyanate-reactive composition and isocyanate in the beaker again at 3,000 rpm for 4 s. After mixing, immediately pour the content of the beaker into a mold (300 millimeter (mm)×200 mm×50 mm) preheated to 60° C. Remove the foam from the mold after curing at 60° C. for 15 minutes. The core density of the molded foam was approximately 40 kg/m³.

Prepare the polyurethane-based cup foams as follows. Prepare a reaction mixture having a total weight of 80 grams (g) for each EX and C EX provided in Table 2 in a 500 mL beaker. Mix the components of the isocyanate-reactive composition provided in Table 2 at 2000 rpm with a rotary mixer for 10 seconds (s). Next, mix the isocyanate-reactive composition and isocyanate in the beaker again at 3000 rpm for 5 s at room conditions (23° C., 50% relative humidity). After 24 hours (h), remove the foam section that has risen above the plane of the beaker top and then excise a center core of 2.54 cm×2.54 cm×2.54 cm.

Analysis of Composition of Smoke Gases

Conduct pyrolysis testing using a Frontier Labs 2020D pyrolyzer mounted on an Agilent 6890 GC with an FID detector. Weigh approximate 200-250 µg of sample into a Frontier labs silica lined stainless steel cup. Perform the pyrolysis by a single shot mode by dropping the sample cup into the oven for analysis under air conditions at 600° C. for 2 min followed under helium conditions for another 2 min. Trap the volatile products emitted from the sample at the head of the separation column using a micro-cryo trapping device (MCT). Achieve separation using a 10 m×0.32 mm ID×5 µm PoraBond Q column from Agilent with a HP-1 (10 m×0.53 mm×2.65 µm) as a guard column. Use the back-inlet pressure for the backflush purpose (a 0.5 m×0.53 mm guard column using back-inlet as its head pressure tee into Pora-Bond Q and HP-1 columns). The HCN was detected on the back FID detector. Use a normalized peak area of HCN by sample weight for HCN concentration comparison. The relative HCN content of transition metal containing sample is defined as the ratio of its normalized HCN peak area divided by the normalized HCN peak area for corresponding Comparative Control Example with no transition metal.

GC Conditions: Front injection Port: 300° C.; Split injector at 1:1; Ramped pressure: 4.9 psi hold for 1.5 min, then to 3.1 psi at 50 psi/min; Back injection port: 4 psi; GC Oven: 40° C. hold for 3 min, to 240° C. at 30° C./min; FID: 250° C., $H_2$ flow: 40 mL/min, air flow: 450 mL/min, make-up gas ($N_2$): 30 mL/min, 50 Hz.

Results

As seen in Table 3 and Table 4, significant reduction of HCN generation is achieved with molded foams containing the liquid chelated transition metal polyol.

TABLE 3

| | C EX A | EX 1 | Ex 2 | EX 3 |
|---|---|---|---|---|
| Metal ion wt % | 0 | 0.50 | 0.37 | 0.22 |
| Relative HCN content | 1.00 | 0.89 | 0.12 | 0.27 |

TABLE 4

| | C EX B | Ex 4 |
|---|---|---|
| Metal ion wt % | 0 | 0.22 |
| Relative HCN content | 1.00 | 0.67 |

As seen in Table 5, significant reduction of HCN generation is achieved with cup foams containing the liquid chelated transition metal polyol.

TABLE 5

|  | C EX C | Ex 5 |
| --- | --- | --- |
| Metal ion wt % | 0 | 0.22 |
| Relative HCN content | 1.00 | 0.69 |

What is claimed is:

1. A metal chelated polyester polyol liquid, comprising: a reaction product of:
    a chelating polyester polyol having a chelating moiety and a metal compound having a metal ion, the chelating polyester polyol formed from:
        a chemical reaction of monomers for a liquid polyester polyol or the liquid polyester polyol formed from the monomers for the liquid polyester polyol and a chelating agent having the chelating moiety, wherein the chelating moiety is selected from a dianhydride moiety, an amino based chelating moiety and combinations thereof, wherein:
            the chelating agent having the dianhydride moiety chemically reacts with the monomers for the liquid polyester polyol or the liquid polyester polyol formed from the monomers for the liquid polyester polyol to form the chelating polyester polyol having an aminopolycarboxylic acid moiety; and
            the chelating agent having the amino based chelating moiety chemically reacts with the one of monomers for the liquid polyester polyol or the liquid polyester polyol formed from the monomers for the liquid polyester polyol to form a polyesteraminopolyol as the chelating polyester polyol; and
    wherein the chelating moiety of the chelating polyester polyol chelates the metal ion to form the metal chelated polyester polyol liquid, having a mole ratio of the metal ion to the chelating moiety of 0.05:1 to 2:1.

2. The metal chelated polyester polyol liquid of claim 1, wherein:
    the chelating agent having the dianhydride moiety chemically reacts with the liquid polyester polyol at a mole ratio of 1:1.5 to 1:100 to form the chelating polyester polyol having an aminopolycarboxylic acid moiety.

3. The metal chelated polyester polyol liquid of claim 1, wherein the metal compound is selected from the group consisting of a hydroxide, a carbonate, a carboxylate, a metal salt and combinations thereof and the metal ion is selected from the group consisting of copper, zinc, silver, iron, manganese, cobalt, nickel, zirconium, calcium, aluminum, barium, cadmium, gallium, indium, lead, magnesium, mercury, palladium, scandium, strontium, thorium, titanium, vanadium and combinations thereof.

4. An isocyanate-reactive composition having a hydroxyl moiety for forming a polyurethane polymer, comprising:
    0.1 to 100 weight percent of the metal chelated polyester polyol liquid of claim 1; and
    optionally up to 99.9 weight percent of a polyol to form the isocyanate-reactive composition, the weight percent based on the total weight of the isocyanate-reactive composition.

5. The isocyanate-reactive composition of claim 4, further including for the metal chelated polyester polyol liquid of claim 1 a compound selected from:
    0.1 wt. % to 7.0 wt. % of phosphorus from a flame-retardant compound, the wt. % of phosphorus based on the overall weight of the isocyanate-reactive composition;
    0.05 wt. % to 14.0 wt. % of the metal from the metal chelated polyester polyol liquid, the wt. % of the metal based on the overall weight of the isocyanate-reactive composition; and
    combinations thereof.

6. A reaction mixture for forming a polyurethane polymer, comprising:
    an isocyanate compound having an isocyanate moiety; and
    the isocyanate-reactive composition of claim 4, wherein the reaction mixture has a molar ratio of the isocyanate moiety to the hydroxyl moiety of 0.90:1 to 7:1.

7. The reaction mixture of claim 6, wherein the reaction mixture includes compounds selected from the group consisting of water, a catalyst, a surfactant, a blowing agent or combinations thereof.

8. A polyurethane-based polymer formed with the reaction mixture of claim 6.

9. A process for preparing a metal chelated polyester polyol liquid of claim 1, the process for preparing the metal chelated polyester polyol liquid comprising:
    reacting monomers for a liquid polyester polyol or the liquid polyester polyol formed from the monomers for the liquid polyester polyol and a chelating agent having a chelating moiety to form a chelating polyester polyol, wherein the chelating moiety is selected from a dianhydride moiety, an amino based chelating moiety and combinations thereof, wherein:
        the chelating agent having the dianhydride moiety chemically reacts with the monomers for the liquid polyester polyol or the liquid polyester polyol formed from the monomers for the liquid polyester polyol to form the chelating polyester polyol having an aminopolycarboxylic acid moiety; and
        the chelating agent having the amino based chelating moiety chemically reacts with the monomers for the liquid polyester polyol or the liquid polyester polyol formed from the monomers for the liquid polyester polyol to form a polyesteraminopolyol as the chelating polyester polyol; and
    reacting the chelating polyester polyol having the chelating moiety with a metal compound having a metal ion, wherein the chelating moiety of the chelating polyester polyol chelates the metal ion to form the metal chelated polyester polyol liquid, the reaction having a mole ratio of the metal ion to the chelating moiety of 0.05:1 to 2:1.

10. The metal chelated polyester polyol liquid of claim 1, wherein:
    the chelating agent having the dianhydride moiety is selected from the group consisting of ethylenediaminetetraacetic dianhydride, diethylenetriaminepentaacetic acid dianhydride and combinations thereof.

11. The metal chelated polyester polyol liquid of claim 1, wherein:
    the chelating agent for the metal chelated polyester polyol liquid having the amino based chelating moiety is selected from the group consisting of an alkoxylated diamine, an alkoxylated triamine and an alkoxylated tetramine and a combinations thereof.

12. The metal chelated polyester polyol liquid of claim 1, wherein:
    the metal compound is selected from the group consisting of copper (II) hydroxide, copper (II) carbonate, basic copper (II) carbonate, copper (II) acetate, cobalt (II) acetate, nickel (II) acetate, silver (I) acetate, zinc (II) acetate, calcium (II) acetate and combinations thereof.

* * * * *